United States Patent
Isshiki et al.

(10) Patent No.: US 10,826,680 B2
(45) Date of Patent: Nov. 3, 2020

(54) COLLATION SYSTEM, COLLATION METHOD, AND NON-TRANSITORY RECORDING MEDIUM

(71) Applicant: NEC CORPORATION, Tokyo (JP)

(72) Inventors: Toshiyuki Isshiki, Tokyo (JP); Haruna Higo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 243 days.

(21) Appl. No.: 15/736,121

(22) PCT Filed: Jun. 14, 2016

(86) PCT No.: PCT/JP2016/002865
§ 371 (c)(1),
(2) Date: Dec. 13, 2017

(87) PCT Pub. No.: WO2016/203762
PCT Pub. Date: Dec. 22, 2016

(65) Prior Publication Data
US 2018/0145825 A1    May 24, 2018

(30) Foreign Application Priority Data
Jun. 18, 2015 (JP) ................................. 2015-122751

(51) Int. Cl.
*H04L 9/00* (2006.01)
*G09C 1/00* (2006.01)
(Continued)

(52) U.S. Cl.
CPC ................ *H04L 9/008* (2013.01); *G09C 1/00* (2013.01); *H04L 9/0618* (2013.01); *H04L 9/0869* (2013.01); *G06F 21/32* (2013.01)

(58) Field of Classification Search
CPC ....... H04L 9/3073; H04L 9/302; H04L 63/08; G06F 21/32
(Continued)

(56) References Cited

U.S. PATENT DOCUMENTS

| | | | |
|---|---|---|---|
| 2005/0028009 A1* | 2/2005 | Neff | H04L 9/3252 726/4 |
| 2010/0246812 A1* | 9/2010 | Rane | H04L 9/302 380/28 |

(Continued)

FOREIGN PATENT DOCUMENTS

| | | |
|---|---|---|
| JP | 2006-158851 A | 6/2006 |
| JP | 2006-210964 A | 8/2006 |

(Continued)

OTHER PUBLICATIONS

Ogata et al. "Zero-knowledge interactive proofs for proving nearness of biometrics and its application," The 29th Symposium on Information Theory and its Applications (SITA2006), Hakodate, Hokkaido, Japan, Nov. 28-Dec. 1, 2006, 4 pgs.

(Continued)

*Primary Examiner* — Bryan F Wright
(74) *Attorney, Agent, or Firm* — Sughrue Mion, PLLC

(57) ABSTRACT

The present invention provides a crypto-information creation device, etc., with which it is possible to create information that enables a safer collation process between information that is the subject of collation and information to be referenced. This crypto-information creation device 501 has: a range encryption unit 502 for calculating a first value included in a range based on a threshold value and encrypting the calculated first value in accordance with a homomorphic encryption scheme, thereby creating a first cryptogram in which the first value is encrypted; and a computation unit 503 for applying a computation according to the encryption scheme to the first cryptogram and to a second crypto- (Continued)

gram in which a second value representing the degree of similarity is encrypted in accordance with the encryption scheme, thereby creating a third cryptogram in which a value obtained by adding together the first value and the second value is encrypted.

8 Claims, 15 Drawing Sheets

(51) Int. Cl.
    *H04L 9/06*           (2006.01)
    *H04L 9/08*           (2006.01)
    *G06F 21/32*         (2013.01)

(58) Field of Classification Search
    USPC .......................................................... 713/189
    See application file for complete search history.

(56) References Cited

U.S. PATENT DOCUMENTS

| | | | | |
|---|---|---|---|---|
| 2013/0318351 A1* | 11/2013 | Hirano | ................. | H04L 9/3073 713/168 |
| 2014/0281567 A1* | 9/2014 | Rane | ....................... | G06F 21/32 713/186 |
| 2015/0033018 A1* | 1/2015 | Tateishi | ................. | H04L 63/08 713/171 |
| 2016/0099807 A1* | 4/2016 | Isshiki | .................... | G06F 21/31 713/168 |
| 2019/0394018 A1* | 12/2019 | Isshiki | ................. | H04L 9/3066 |

FOREIGN PATENT DOCUMENTS

| | | |
|---|---|---|
| JP | 2008-521025 A | 6/2008 |
| JP | 2009-129292 A | 6/2009 |
| JP | 2010-237653 A | 10/2010 |
| JP | 2014-109934 A | 6/2014 |
| JP | 2014-126865 A | 7/2014 |
| WO | 2007/066385 A1 | 6/2007 |
| WO | 2012/114452 A | 8/2012 |
| WO | 2014/175334 A1 | 10/2014 |
| WO | 2014/185447 A | 11/2014 |
| WO | 2014/185450 A1 | 11/2014 |

OTHER PUBLICATIONS

Shahandashti et al., "Private Fingerprint Matching," ACISP 2012, 20 pgs.
International Search Report for PCT/JP2016/002865, dated Aug. 30, 2016 (PCT/ISA/210).
Written Opinion of the International Searching Authority for PCT/JP2016/002865, dated Aug. 30, 2016.
Haruna Higo, et al., "A Private Fingerprint Matching Scheme with Small Templates", SCIS 2015, The 32nd Symposium on Cryptography and Information Security Kokura, Japan, Jan. 20-23, 2015, The Institute of Electronics, Information and Communication Engineers.
Jun Kogure, et al., "Privacy-preserving Biometric Authentication by using Homomorphic Encryption", SCIS 2014, The 31st Symposium on Cryptography and Information Security, Kagoshima, Japan, Jan. 21-24, 2014, The Institute of Electronics, Information and Communication Engineers.

* cited by examiner

COLLATION SYSTEM, COLLATION METHOD, AND NON-TRANSITORY RECORDING MEDIUM

CROSS REFERENCE TO RELATED APPLICATIONS

This application is a National Stage of International Application No. PCT/JP2016/002865 filed Jun. 14, 2016, claiming priority based on Japanese Patent Application No. 2015-122751, filed Jun. 18, 2015, the contents of all of which are incorporated herein by reference in their entirety.

TECHNICAL FIELD

The present invention relates to a cipher-information generation device and the like that generate reference information when, for example, collation target information is collated.

BACKGROUND ART

A data service is spreading with popularization of cloud computing (hereinafter, referred to as a "cloud"). In the data service, data of users are stored on computing resources connected to a communication network (hereinafter, referred to as a "network") in a cloud and the stored data are used. The data service frequently manages highly-confidential data. It is necessary for the data service to guarantee that the managed data are safe.

Safety of the managed data is important in a communication network freely communication-connectable (open) to a user. Therefore, research and development of a technique for managing encrypted data without decrypting the encrypted data, and executing retrieval and processing such as statistical processing without decrypting the encrypted data is actively being conducted.

Further, crimes committed using vulnerability in personal authentication using a password or a magnetic card frequently occur. As a result, attention has been focused on a biometric authentication technique that realizes authentication with higher safety by using authentication information based on a character (biometric information) of a fingerprint or a living organism such as a vein. The biometric authentication technique stores a template for identifying biometric information on a database and determines whether or not biometric information to be authenticated is acceptable based on the stored template.

Biometric information such as a fingerprint or a vein is regarded as individual data basically unchanged in future. Therefore, when biometric information leaks to outside of a database, damage thereof is extensive. Therefore, the biometric information is one piece of information to be required for high confidentiality.

Prevention of impersonation is required in a biometric authentication technique similarly to other authentication techniques. The impersonation is that a living organism other than a registered living organism for biometric information impersonates the registered living organism. A biometric authentication technique of a template protection type, for example, executes authentication with the above-described template concealed. Thereby, even when a template leaks, the biometric authentication technique prevents "impersonation" based on the leaked template.

Hereinafter, with reference to PTL 1 to PTL 9, NPL 1, and NPL 2, techniques relating to the biometric authentication technique will be described.

A scheme disclosed in PTL 1 adds random coordinate values to data including coordinate values representing a shape of a fingerprint ridge, and thereby generates a template in which the data are concealed. The scheme executes biometric authentication on the basis of the template.

A collation system disclosed in PTL 2 introduces intervention of a reliable third party, and thereby conceals data registered on a server storing confidential information relating to the collation system. However, according to the collation system, a load on the third party in collation processing is large.

According to a technique disclosed in PTL 3, in a system employing intervention of a reliable third party, a load on the third party in collation processing is reduced than the collation system disclosed in PTL 2. However, according to the technique disclosed in PTL 3, when a an index of a distance is Euclidean distance, a size of registered data increases in proportion to a fourth power of an index representing allowable ambiguity.

A scheme disclosed in PTL 4 is a scheme in which a size of cipher-data stored on a database is independent of a parameter of allowable ambiguity and a load on a third party is small. According to the scheme, it is possible to execute decryption from the cipher-data to plaintext data and execute decryption from collation target data to plaintext data. The scheme calculates a distance between stored plaintext data and plaintext data for the collation target and collates them based on the calculated distance.

A cipher-text collation system disclosed in PTL 5 generates assist data for a first cipher-text registered on a storage device and a second cipher-text to be a collation target, respectively, and calculates a Hamming distance between plaintexts corresponding to pieces of the generated assist data. The cipher-text collation system executes collation processing for the second cipher-text on the basis of whether or not the calculated Hamming distance is less than or equal to a predetermined value.

A personal authentication system disclosed in PTL 6 stores a password and a scramble element that is a word different from the password, and displays the password and the scramble element during authentication. The personal authentication system authenticates a user, when the user selects only a password out of the displayed scramble element and the password.

An encryption processing device disclosed in PTL 7 calculates an cipher-concealment distance between a first vector including a plurality of numerical values and a second vector including a plurality of numerical values. First, the encryption processing device calculates a first weight for the first vector and a second weight for the second vector. The encryption processing device encrypts the calculated first weight and the calculated second weight in accordance with a homomorphic encryption scheme, and calculates an cipher-concealment distance between the first vector and the second vector on the basis of the encrypted first weight and the encrypted second weight.

An anonymized data generation device disclosed in PTL 8 adds/subtracts, to/from a numerical-value attribute value including a plurality of numerical values included in a data block, each numerical value included in the numerical-value attribute value, and thereby generates a set of data blocks representing a set of numerical-value attribute values located within a predetermined distance from the former numerical-value attribute value.

In PTL 8, the data block includes a confidential attribute value and a numerical-value attribute value. The anonymized data generation device calculates a frequency distribution between each data block included in the generated set of the data blocks and the confidential attribute value, and determines whether or not the calculated frequency distribution satisfies a predetermined condition. The anonymized data generation device replaces a numerical-value attribute value included in a data block that satisfies the predetermined condition with a numerical-value attribute value located within the predetermined distance.

In an information reception/transmission device disclosed in PTL 9, a transmitter encrypts, in response to an inquiry, a response to the inquiry by using a public key, and transmits the encrypted response to a receiver. The receiver receives the response and decrypts the response by using a secret key.

A scheme disclosed in NPL 1 ensures confidentiality of biometric information stored on a server by using a homomorphic public key encryption.

NPL 1 discloses a biometric authentication scheme capable of concealing biometric information of a client requiring an authentication. The biometric authentication scheme executes authentication processing in accordance with an encryption protocol that is Aided_Computation and an encryption protocol that is Set_Intersection.

According to a concealed fingerprint authentication scheme disclosed in NPL 2, a public key encryption referred to as a somewhat homomorphic encryption is used instead of a homomorphic encryption. According to the concealed fingerprint authentication scheme, a size of registered data has a square order size with respect to an index of allowable ambiguity.

CITATION LIST

Patent Literature

PTL 1: Japanese Unexamined Patent Application Publication No. 2006-158851
PTL 2: International Publication No. WO 2014/185450
PTL 3 International Publication No. WO 2014/185447
PTL 4 International Publication No. WO 2012/114452
PTL 5 International Publication No. WO 2014/175334
PTL 6 International Publication No. WO 2007/066385
PTL 7: Japanese Unexamined Patent Application Publication No. 2014-126865
PTL 8: Japanese Unexamined Patent Application Publication No. 2014-109934
PTL 9: Japanese Unexamined Patent Application Publication No. 2006-210964

Non Patent Literature

NPL 1: "Private Fingerprint Matching", Siamak F. Shahandashti, Reihaneh Safavi-Naini, and Philip Ogunbona, ACISP 2012, pp 426-433
NPL 2: "Template size no tiisai hitoku shimon ninshou houshiki", Higo, Isshiki, Mori, Obana, the Symposium on Cryptography and Information Security (SCIS 2015), 2015

SUMMARY OF INVENTION

Technical Problem

However, even when any of the techniques disclosed in PTL 1 to PTL 9, NPL 1, and NPL 2 is used or these techniques are combined in any way, data in which confidentiality needs to be guaranteed may leak. The data in which confidentiality needs to be guaranteed are, for example, a distance between a template and target data. The reason is that it is necessary to decrypt a distance between target data representing an authentication target and a template upon collation, and therefore data generated by the decryption may leak.

In other words, upon use of a technique as described above, even when a distance between target data representing an authentication target and a template is calculated as-concealed, the concealed distance is decrypted, and as a result, whether or not the decrypted value for the concealed distance satisfies a predetermined condition determines whether or not the target data are accepted. Therefore, according to the technique, a hill climbing attack may be suffered, for example, based on a decrypted distance.

Therefore, a main object of the present invention is to provide a cipher-information generation device and the like capable of generating information that realizes safer collation processing between collation target information and reference information.

Solution to Problem

In order to achieve the aforementioned object, as an aspect of the present invention, a cipher-information generation device including:

range encryption means for calculating first values included in a range based on a threshold value, encrypting the calculated first values in accordance with a homomorphic encryption scheme, and thereby generating a first cipher-text in which the first values are encrypted; and computation means for applying a computation in accordance with the encryption scheme to the first cipher-text and a second cipher-text in which a second value representing an extent of similarity is encrypted in accordance with the encryption scheme, and thereby generating a third cipher-text in which a value obtained by encrypting a sum of the first values and the second value.

In addition, as another aspect of the present invention, a cipher-information generation method including:

calculating first values included in a range based on a threshold value, encrypting the calculated first values in accordance with a homomorphic encryption scheme, and thereby generating a first cipher-text in which the first values are encrypted; and applying a computation in accordance with the encryption scheme to the first cipher-text and a second cipher-text in which a second value representing an extent of similarity is encrypted in accordance with the encryption scheme, and thereby generating a third cipher-text in which a value obtained by encrypting a sum of the first values and the second value.

Furthermore, the object is also realized by an associated cipher-information generation program, and a computer-readable recording medium which records the program.

Advantageous Effects of Invention

According to a cipher-information generation device and the like according to the present invention, it is possible to generate information that realizes safer collation processing between collation target information and reference information.

DESCRIPTION OF EMBODIMENTS

Figure 1:
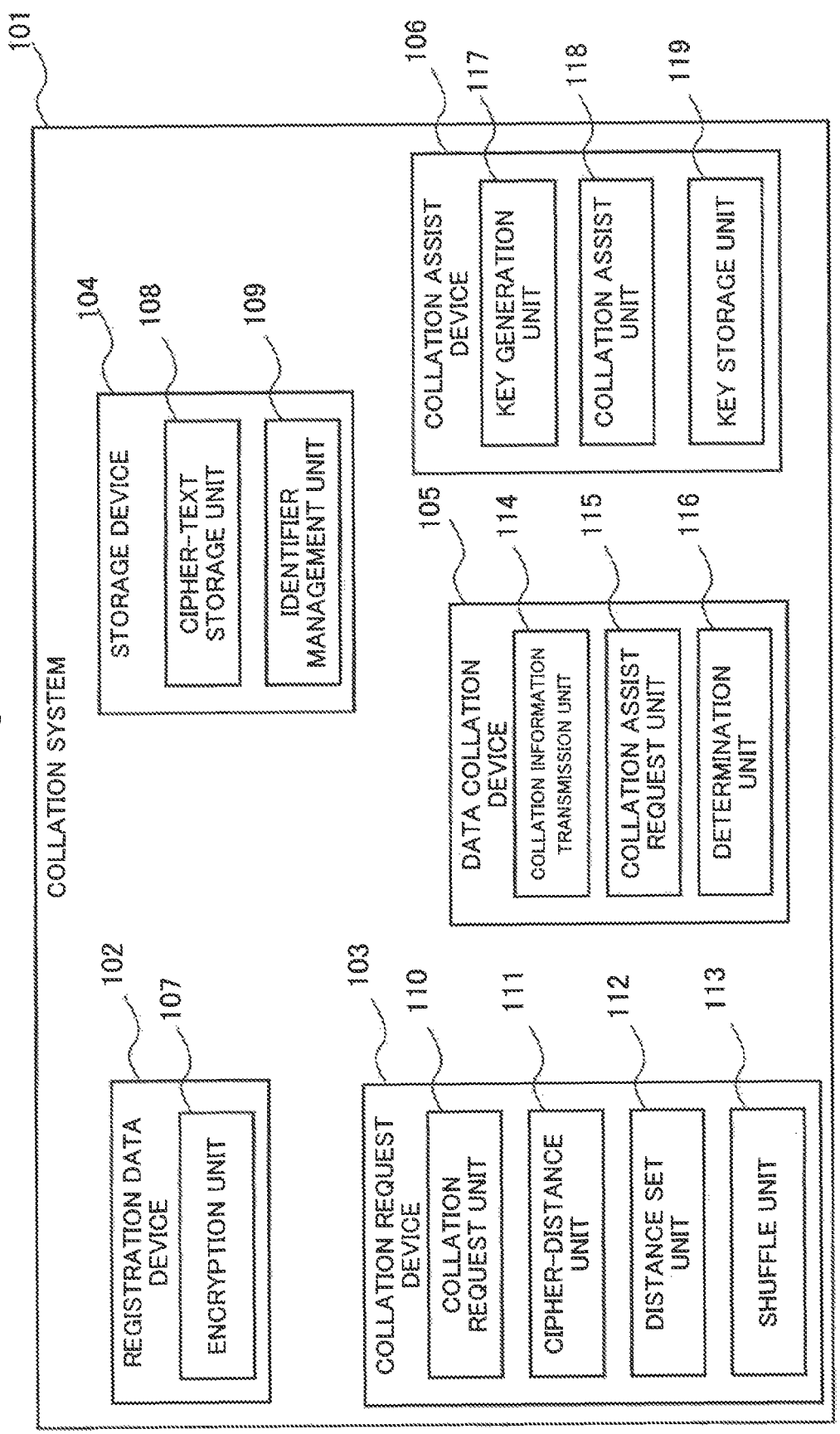
FIG. 1 is a block diagram illustrating a configuration of a collation system according to a first example embodiment of the present invention.

First, some operators used in each example embodiment of the present invention will be described.

In an equation identified by the following equation number, an equal operator "=" may be used, and the equal operator indicates that equations (values) coupled by using the equal operator are equivalent. Further, " . . . " described in a middle of each equation indicates that similar computations included in the middle are omitted. For example, "1+ . . . +N" represents a summation of integer values from 1 to N. Further, for example, "X(1)+ . . . +X(N)" represents a summation of X(I) for integers I from 1 to N. For example, "1, . . . , N" represents integers from 1 to N. Further, in the following equation, a power operator "^" may be used. For example, Q^R represents an R-th power of Q.

Next, a biometric authentication device that is one example to which the present invention is applicable will be described, and thereafter a technique relating to the present invention will be described.

Next, one example of a biometric authentication device will be described.

A biometric authentication device extracts a fingerprint ridge in biometric information (e.g., an image such as a fingerprint) and generates feature points (minutia) representing the extracted ridge. The biometric authentication device registers the generated minutia on an information processing apparatus such as a server as a template to be referred to when authenticating target information representing a target to be authenticated. In a two-dimensional coordinate space X-Y, the minutia includes, for example, coordinate values (x, y) included in a ridge, a type representing a feature of the ridge at the coordinate values, and an angle θ representing a direction of the ridge at the coordinate values. θ, x, and y each represents a real number. The type includes, for example, a type indicating an end point of the ridge at the coordinate values, a type indicating a branch point of ridge at the coordinate values, or the like. The direction of the ridge is, for example, an inclination of a tangential direction of the ridge at the coordinate values.

When authenticating a client, the biometric authentication device determines whether or not a minutia generated based on biometric information of the client and a minutia generated based on acceptable biometric information match. A condition of matching two certain minutiae, for example, includes the following three conditions:

(Condition 1) In the two minutiae, types match, (Condition 2) In the two minutiae, a distance between two coordinate values is less than or equal to a predetermined range, and (Condition 3) In the two minutiae, a difference between two angles is less than or equal to a predetermined range.

More specifically, when two minutiae are denoted as $(type_1,(x_1,y_1),\theta_1)$, $(type_2,(x_2,y_2),\theta_2)$, the three conditions are, for example, the following three conditions, respectively:

(Condition 1) $type_1$ and $type_2$ match, (Condition 2) $0 \leq ((x_1-x_2)_2+(y_1-y_2)_2) \leq \delta_d$, and (Condition 3) $0 \leq (\theta_1-\theta_2)^2 \leq \delta_t$, wherein $\delta_d$ and $\delta_t$ represent a parameter such as a threshold "t" representing a reference for determining acceptability. The terms $\theta_1$, $\theta_2$, $x_1$, $x_2$, $y_1$, and $y_2$ each represent a real number.

In the example indicated in the condition 2, a distance is measured, for example, by using a two-dimensional Euclidean distance or an L2 norm. In the example indicated in the condition 3, a distance is measured, for example, by using a one-dimensional Euclidean distance. Hereinafter, for description convenience, a broad-sense distance including the above-described narrow-sense distance and the like will be collectively represented as a "Euclidean distance". A Euclidean distance "d"(QA,QB) represents, for example, a distance between QA and QB.

Next, a technique relating to the present invention will be described. First, a public key encryption relating to an encryption protocol will be described.

A public key encryption includes an algorithm (key generation algorithm) for generating a key, an algorithm (encryption algorithm) for executing encryption by using the generated key, and an algorithm (decryption algorithm) for decrypting cipher-data generated by encryption with a decryption key. The key generation algorithm is a probabilistic algorithm that calculates a public key and a secret key on the basis of a security parameter such as a parameter for defining a length of a decryption key. The encryption algorithm is a probabilistic algorithm that calculates a cipher-text, which is an encrypted message, with a public key. The decryption algorithm is a deterministic algorithm that calculates a decryption result for a cipher-text by decrypting the cipher-text with a secret key, An algorithm of a public key encryption includes the following three algorithms: key generation algorithm, encryption algorithm, and decryption algorithm: i.e.

Key generation algorithm KeyGen: $(1^k) \rightarrow (pk,sk)$,

Encryption algorithm Enc: $(pk,M) \rightarrow C$, and

Decryption algorithm Dec: $(sk,C) \rightarrow M$, wherein $1^k$ (i.e., a bit string in which 1 is aligned for k bits) represents a security parameter. The term pk is a public key. The term sk is a secret key. M is an input massage. C is a cipher-text. Enc represents encryption processing. Dec represents decryption processing. A left side of an operator "$\rightarrow$" indicated by a right arrow represents an input, and a right side of the operator "$\rightarrow$" represents an output calculated upon the input.

In the public key encryption, a scheme satisfying a condition indicated in Eqn. 1 is referred to as a homomorphic public key encryption: i.e.

$$\text{Enc}(pk,M_1 \# M_2) = \text{Enc}(pk,M_1) @ \text{Enc}(pk,M_2) \quad \text{(Eqn. 1)}$$

wherein # and @ represent certain operators different from each other. Further, $M_1$ and $M_2$ each represent a message.

Next, a Paillier cryptosystem, that is one example of a homomorphic public key encryption in encryption protocols, will be described.

For description convenience, it is assumed that (Q)mod (R) represents an operation of calculating a residue when Q is divided by R. Q and R each represent an integer. It is assumed that $Z_{\{n^2\}}$ represents a set of numbers mutually disjoint with respect to $n^2$ (i.e., a greatest common divisor is 1) among integers from 0 to $n^2-1$. It is assumed that an operator "/" represents a reciprocal. For example, "1/Q" represents a reciprocal of Q. Further, for example, "Q/R" represents a value obtained by multiplying Q by a reciprocal of R.

A Paillier cryptosystem is one example of a public key encryption in which, for example, the operator "@" in Eqn. 1 is a multiplication operator and the operator "#" in Eqn. 1 is an addition (additive) operator. In other words, the Paillier cryptosystem is one example of an additive homomorphic public key encryption.

More specifically, the Paillier crypto system includes the following key generation algorithm, encryption algorithm, and decryption algorithm.

(Key generation algorithm): A security parameter $1^k$ is received as an input. A k-bits prime number p and a prime number q are selected at random, and pxq (designated as "n") is calculated. By using the calculated "n", ((1+n)mod ($n^2$)) (designated as "g") is calculated. A value (n,g) is set as a public key pk. A value (p,q) is set as a secret key sk.

(Encryption algorithm): A public key pk and a message M are received as an input. "r" is selected at random from $Z_{\{n^2\}}$. A value $((1+m \times n) \times r^n) \bmod(n^2))$ is calculated, and the calculated value is set as a cipher-text C.

(Decryption algorithm): A secret key sk and a cipher-text C are received as an input. A value $(p-1) \times (q-1)$ (a calculated value is designated as $\lambda$) is calculated. A value $((c^{\{\lambda\}}) \bmod (n^2-1))/(((g^{\{\lambda\}}) \bmod (n^2-1)) \bmod(n))$ is calculated, and the calculated result is output as a plaintext "m".

Next, a reason why a Paillier cryptosystem is homomorphic will be described.

As one example, a cipher-text C1 is defined in accordance with Eqn. 2. Further, a cipher-text C2 is defined in accordance with Eqn. 3.

$$C1 = \text{Enc}(pk,M_1) = ((1+M_1 \times n) \times r1^n) \bmod(n^2) \quad \text{(Eqn. 2)}.$$

$$C2 = \text{Enc}(pk,M_2) = ((1+M_2 \times n) \times r2^n) \bmod(n^2) \quad \text{(Eqn. 3)}.$$

In this case, a value obtained by multiplication of C1 and C2 is calculated and thereby Eqn. 4 is obtained: i.e.

$$\begin{aligned}C1 \times C2 &= ((1 + (M_1 + M_2) \times n + M_1 \times M_2 \times n^2) \times (r1 \times r2)^n) \bmod(n^2) \\ &= ((1 + (M_1 + M_2) \times n) \times (r1 \times r2)^n) \bmod(n^2) \\ &= \text{Enc}(pk, M_1 + M_2).\end{aligned} \quad \text{(Eqn. 4)}$$

In the basis of Eqn. 4, "$\text{Enc}(pk,M_1) \times \text{Enc}(pk,M_2) = \text{Enc}(pk, M_1+M_2)$" is satisfied, and therefore a homomorphic condition indicated by using two different types of operators (#,@) in Eqn. 1 is satisfied. Therefore, a Paillier cryptosystem is homomorphic. In other words, the homomorphism in the present example indicates that a cipher-text in which an addition result of a message $M_1$ and a message $M_2$ is encrypted is equal to a cipher-text in which a cipher-text in which the message $M_1$ is encrypted and a cipher-text in which the message $M_2$ is encrypted are multiplied. In other words, it is indicated that when homomorphism is used, processing for a message can be executed while a cipher-text is concealed without being decrypted.

Next, in the encryption protocol that is one example of the technique relating to the present invention, Set_Intersection will be described. Set_Intersection is an encryption protocol used between an entity Alice and an entity Bob. For example, Alice represents a client, and Bob represents a server. This encryption protocol is described below.

It is assumed that Alice possesses a certain piece of data "a" and Bob possesses a set B of pieces of data. In this case, Set_Intersection represents a protocol that determines whether or not the data "a" is included in the set B while the data "a" is concealed from Bob.

For description convenience, by using an example in which the set B is designated as $\{b_1,b_2,b_3\}$, Set_Intersection will be described. It is assumed that Bob opens a public key pk in accordance with an additive homomorphic public key encryption and holds a secret key sk capable of decrypting a cipher-text encrypted with the public key pk.

Bob generates a polynomial F(x) that satisfies a condition that the value of the polynomial is 0 when a value of x is $b_1$, $b_2$, or $b_3$ and that the value is other than 0 when x is another value. Bob generates, for example, $(x-b_1) \times (x-b_2) \times (x-b_3)$ as the polynomial F(x). Bob can generate a polynomial F(x) on the basis of Lagrange interpolation. Description itself on the Lagrange interpolation is omitted.

In general, with regard to an n-th-order polynomial F(x), a coefficient of a term of each order is designated as $\alpha[i]$ (where $0 \leq i \leq n$). In other words, in this case, the polynomial is represented as Eqn. 5.

$$F(x) = \alpha[n] \times x^n + \alpha[n-1] \times x^{\{n-1\}} + \ldots + \alpha[1] \times x + \alpha[0] \quad \text{(Eqn. 5)}.$$

Bob generates a cipher-text C[i] in which $\alpha[i]$ (where $0 \leq i \leq n$) is encrypted on the basis of the encryption key pk. Bob transmits the generated cipher-text C[i] to Alice.

Alice receives the cipher-text C[i] transmitted by Bob. Alice calculates a value $a^{\{i\}}$ in which the piece of data "a"

is raised to the power of i (where 0≤i≤n). Further, Alice calculates $C[i]^{\{a^{\wedge}\{i\}\}}$ by calculating the $a^{\{i\}}$-th power of the received cipher-text C[i].

Alice calculates a cipher-text C by using the calculated $C[i]^{\{a^{\wedge}\{i\}\}}$ in accordance with Eqn. 6 as follows: i.e.

$$C = C[n]^{\{a^{\wedge}\{n\}\}} \times C[n-1]^{\{a^{\wedge}\{n-1\}\}} \times \ldots \times C[0]^{\{a^{\wedge}\{0\}\}}. \quad \text{(Eqn. 6)}$$

It is understandable that Eqn. 6 is equivalent to Enc(pk, F(a)) represented in Eqn. 7 by equation deformation described below: i.e.

$$\begin{aligned} C &= Enc(pk, \alpha[n])^{\{a^{\wedge}\{n\}\}} \times \ldots \times Enc(pk, \alpha[0])^{\{a^{\wedge}\{0\}\}} \quad \text{(Eqn. 7)} \\ &= Enc(pk, \alpha[n] \times a^{\{n\}}) \times \ldots \times Enc(pk, \alpha[0] \times a^{\{0\}}) \\ &= Enc(pk, \alpha[n] \times a^{\{n\}} + \ldots + \alpha[0] \times a^{\{0\}}) \\ &= Enc(pk, F(a)), \end{aligned}$$

wherein pk represents a public key pk to which Alice and Bob can refer.

The cipher-text C calculated by Alice is Enc(pk,F(a)) as in Eqn. 7. Further, Alice calculates a random number "r" and calculates a value $C^{\{r\}}$ (hereinafter, referred to as a "CP") in which the cipher-text C is raised to a random number r-th power on the basis of the calculated random number "r". In this case, Alice calculates a random number "r" (where "r" is a real number other than 0), for example, in accordance with a procedure of generating a pseudo-random number. Alice transmits the calculated value CP to Bob.

Bob receives the value CP, decrypts the received value CP by using the secret key sk, and thereby calculates a decryption result (i.e., r×F(a)) in which the value CP is decrypted. When the calculated decryption result is 0, F(a) is 0. In other words, when x is $b_1$, $b_2$, or $b_3$, the polynomial F(x) is 0, and therefore "a" is equal to any one of $b_1$, $b_2$, and $b_3$. Therefore, Bob determines that Alice possesses data included in B when the calculated decryption result is 0. Bob determines that Alice does not possess data included in B when the calculated decryption result is a number other than 0.

For description convenience, a Set_Intersection protocol realized using Alice possessing an input "a", and Bob possessing a set B and a secret key sk as described above is expressed as SetIntersection[Alice(a), Bob(B,sk)](pk). It is assumed that the expression method for the Set_Intersection protocol will be used when the protocol is referred to in description to be made later.

Next, one example of an authentication scheme that executes authentication processing in accordance with a Set_Intersection protocol and an Aided_Computation protocol in the encryption protocol will be described. Description on the Aided_Computation protocol itself will be omitted.

The authentication scheme is a scheme that collates a minutia $(type_1,(x_1,y_1),\theta_1)$ with respect to a client to be authenticated with a template $(type_2,(x_2,y_2),\theta_2)$ in accordance with the two protocols. In the authentication scheme, authentication processing is executed, for example, in accordance with processing indicated in the following processing N1 to processing N3.

Processing N1: determine whether or not two types (i.e., $type_1$ and $type_2$) match. In other words, a Set_Intersection protocol in which in the description of Set-Intersection, Alice is a client, data "a" is a type $type_1$, Bob is a server, and a set B is a set including a type $type_2$ is executed. In other words, the protocol can be expressed as a SetIntersection [client($type_1$),server ($type_2$,sk)](pk).

Processing N2: calculate whether or not a distance is acceptable. In other words, in accordance with processing such as the following processing (N2-1) to (N2-6), calculate whether or not a distance is acceptable.

Processing (N2-1): calculate a Euclidian distance between coordinate values $(x_1,y_1)$ and coordinate values $(x_2,y_2)$ without decrypting.

Processing (N2-2): A server generates a set B including values from 0 to $\delta_d$ on the basis of a threshold value $\delta_d$. In other words, the server generates B={0, 1, . . . , $\delta_d$}. The server then generates a polynomial F(x) that indicates 0 on a value included in the generated set B and a value other than 0 on a value other than the value.

Processing (N2-3): The server calculates a cipher-text Enc(pk,$x_2^2$) in which a value $x_2^2$ is encrypted, a cipher-text Enc(pk,$x_2$) in which a value $x_2$ is encrypted, a cipher-text Enc(pk,$y_2^2$) in which a value $y_2^2$ is encrypted, and a cipher-text Enc(pk,$y_2$) in which a value $y_2$ is encrypted. The server transmits the calculated cipher-texts to a client.

Processing (N2-4): The client receives the cipher-texts. The client calculates a cipher-text Enc(pk,$x_1^2$) in which a value $x_1^2$ is encrypted and a cipher-text Enc(pk,$y_1^2$) in which a value $y_1^2$ is encrypted.

Processing (N2-5): The client calculates, using the calculated cipher-texts and the received cipher-texts, a value Enc(pk,$(x_1-x_2)^2+(y_1-y_2)^2$) in which the cipher-texts are multiplied, by multiplying the calculated values and the like as represented in Eqn. 13.

$$Enc(pk,x_1^2) \times \{Enc(pk,x_2)\}^{\{-2 \times x1\}} \times Enc(pk,x_2^2) \times \\ Enc(pk,y_1^2) \times \{Enc(pk,y_2)\}^{\{-2 \times y1\}} \times Enc(pk,y_2^2) \quad \text{(Eqn. 13)},$$

Processing (N2-6): Processing is executed in accordance with Aided_Computation in which Alice is a client, data "a" is "$(x_1-x_2)^2+(y_1-y_2)^2$", Bob is a server, and a set B is {0, 1, . . . $\delta_d$}.

Processing N3: The server determines whether or not angles (i.e., $\theta_1$ and $\theta_2$) are matched by the following processing (N3-1) to (N3-3).

Processing (N3-1): The server calculates Enc(pk, $(\theta_1-\theta_2)^2$) in accordance with processing similar to the processing indicated in processing (N2-1) to processing (N2-6).

Processing (N3-2): The server generates a set BP including values from 0 to $\delta_t$ on the basis of a threshold value $\delta_t$. In other words, the server generates BP={0, 1, . . . , $\delta_1$}.

Processing (N3-3): The server executes processing in accordance with Aided_Computation for a polynomial G(x) that indicates 0 for a value included in the generated set BP.

However, according to an authentication scheme that executes authentication processing in accordance with the above-described Set_Intersection protocol and Aided_Computation protocol, a problem is that a load on a server in collation is large. The reason is that it is necessary for the server to decrypt data transmitted from a client and to re-encrypt the decryption result. Further, according to the authentication scheme, data registered on the server are a plaintext, and therefore there are a problem that it is difficult to always conceal the data, a problem that it is difficult to always conceal a distance calculated in the above-described step, and the like. The inventors of the present invention have found problems as described above.

Next, registration data and target data that are terms used for convenience in the following description of the present description will be described. It is assumed that the registration data are data representing a target to be concealed. It is assumed that the target data is a target to be collated with registration data. The registration data is, for example, a template in fingerprint collation. The target data is a minutia generated based on client biometric information when authenticating, for example, the client. In fingerprint collation, for example, a minutia (i.e. target data) received from a client and a template (i.e. registration data) are collated with each other, and it is determined whether or not the client is acceptable (can be accepted) based on the collation result.

In the following description, "acceptance" represents that the target data can be accepted, for example, when registration data and target data are similar to each other (or matches).

In the following description, for description convenience, processing will be described using a word that is a "distance" in each example embodiment of the present invention. The distance is, for example, a Euclidian distance calculated using elements of target data and elements of registration data. However, not necessarily a wording of a distance but another index (a similarity degree representing an extent that target data and registration data are similar to each other) may be employed.

Hereinafter, example embodiments of the present invention capable of solving above-described problems will be described in detail with reference to the accompanying drawings.

First Example Embodiment

Referring to FIG. 1, a configuration of a collation system 101 according to a first example embodiment of the present invention will be described in detail. FIG. 1 is a block diagram illustrating a configuration of the collation system 101 according to the first example embodiment of the present invention.

The collation system 101 according to the first example embodiment roughly includes a registration data device 102, a collation request device 103, a storage device 104, a data collation device 105, and a collation assist device 106.

The registration data device 102 includes an encryption unit 107.

The collation request device 103 includes a collation request unit 110, a cipher-distance unit 111, a distance set unit 112, and a shuffle unit 113.

The storage device 104 includes a cipher-text storage unit 108 and an identifier management unit 109.

The data collation device 105 includes a collation information transmission unit 114, a collation assist request unit 115, and a determination unit 116.

The collation assist device 106 includes a key generation unit 117, a collation assist unit 118, and a key storage unit 119. It is assumed that the key storage unit 119 can be referred to only by the collation assist device 106 in the collation system 101.

It is assumed that the registration data device 102, the collation request device 103, the storage device 104, the data collation device 105, and the collation assist device 106 are mutually communicable, for example, via a communication network.

Next, processing in the collation system 101 including the configuration as described above will be described in detail. Processing of the collation system 101 of each example embodiment of the present invention is roughly classified into three phases including a setup phase, a data registration phase, and a cipher-text collation phase. First, outlines of processing included in the three phases will be described.

The setup phase represents a phase that mainly generates an encryption key and a decryption key on the basis of an input security parameter in accordance with an additive homomorphic encryption as described by referring to Eqn. 1 described above.

The data registration phase represents a phase that mainly stores cipher-registration-information generated by processing of encrypting received registration data or the like on the cipher-text storage unit 108.

The cipher-text collation phase is a phase that mainly determines acceptability of target data on the basis of cipher-registration-information stored on the cipher-text storage unit 108 while registration data are concealed.

Each of the above-described operations of the three phases will be described in detail.

Figure 2:
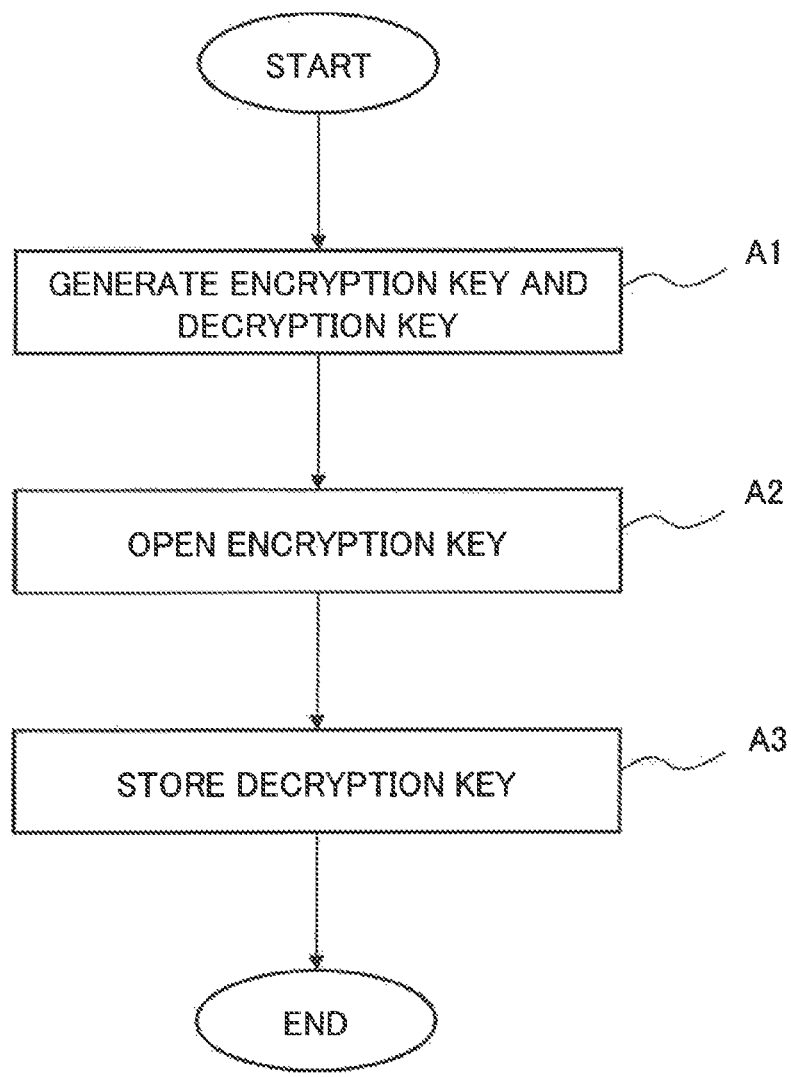
FIG. 2 is a flowchart illustrating a processing flow in a setup phase of the collation system according to the first example embodiment.

First, referring to FIG. 2, processing in a setup phase of the collation system 101 according to the first example embodiment will be described. FIG. 2 is a flowchart illustrating a processing flow in the setup phase of the collation system 101 according to the first example embodiment.

The key generation unit 117 in the collation assist device 106 receives a security parameter including information that specifies a length of a key to be generated, for example, from an external device. The key generation unit 117 generates an encryption key and a decryption key according to the received security parameter in accordance with an additive homomorphic encryption (step A1). The key generation unit 117 generates an encryption key and a decryption key, for example, in accordance with a key generation algorithm in the above-described Paillier cryptosystem. The key generation unit 117 opens the generated encryption key in the collation system 101 (step A2). The key generation unit 117 stores the generated decryption key on the key storage unit 119 in the collation assist device 106 (step A3).

Figure 3:
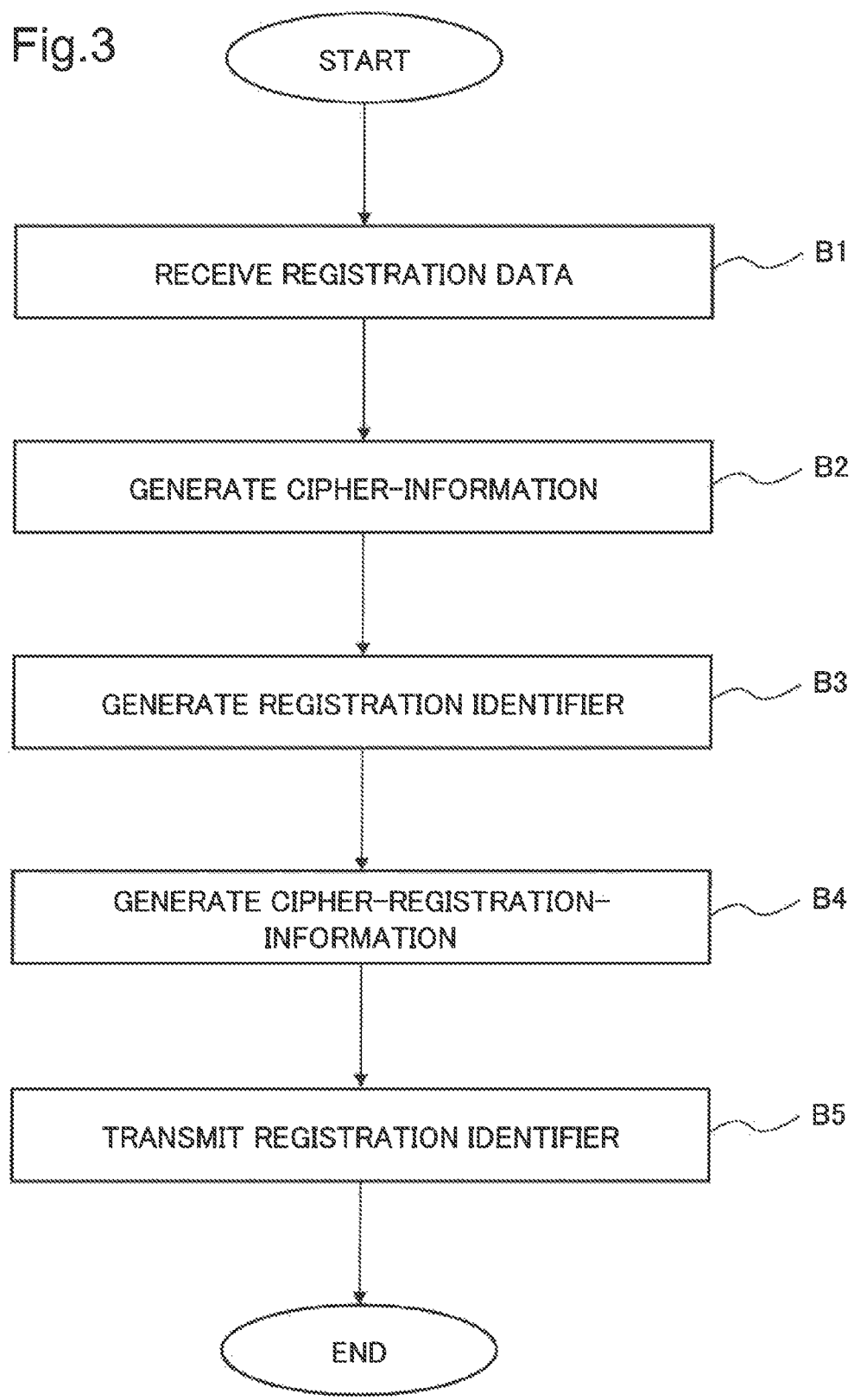
FIG. 3 is a flowchart illustrating a processing flow in a data registration phase of the collation system according to the first example embodiment.

Next, referring to FIG. 3, processing in a data registration phase of the collation system 101 according to the first example embodiment will be described. FIG. 3 is a flowchart illustrating a processing flow in the data registration phase of the collation system 101 according to the first example embodiment.

The encryption unit 107 in the registration data device 102 receives registration data representing a target to be concealed, for example, from an external device (step B1). The encryption unit 107 then encrypts the registration data by using the encryption key generated by the collation assist device 106. Further, the encryption unit 107 calculates an index representing a volume (size) of the registration data on the basis of elements of the registration data and encrypts the calculated index representing the size. The encryption unit 107 calculates, for example, a square sum of the elements as an index representing the size and encrypts the calculated sum. The encryption unit 107 generates cipher-information including the encrypted registration data and the encrypted index (step B2). The encryption unit 107 transmits the generated cipher-information to the identifier management unit 109 in the storage device 104.

The identifier management unit 109 in the storage device 104 receives the cipher-information transmitted by the encryption unit 107 and generates a registration identifier for identifying the received cipher-information (step B3). The identifier management unit 109 generates cipher-registration-information associating the generated registration identifier with the received cipher-information (step B4) and stores the generated cipher-registration-information on the cipher-text storage unit 108 in the storage device 104. The identifier management unit 109 may transmit the registration identifier to the registration data device 102 (step B5). Alternatively, the identifier management unit 109 may display the registration identifier on a user interface (UI) such as a display.

The registration data device 102 may display the registration identifier transmitted by the identifier management unit 109.

Figure 4:
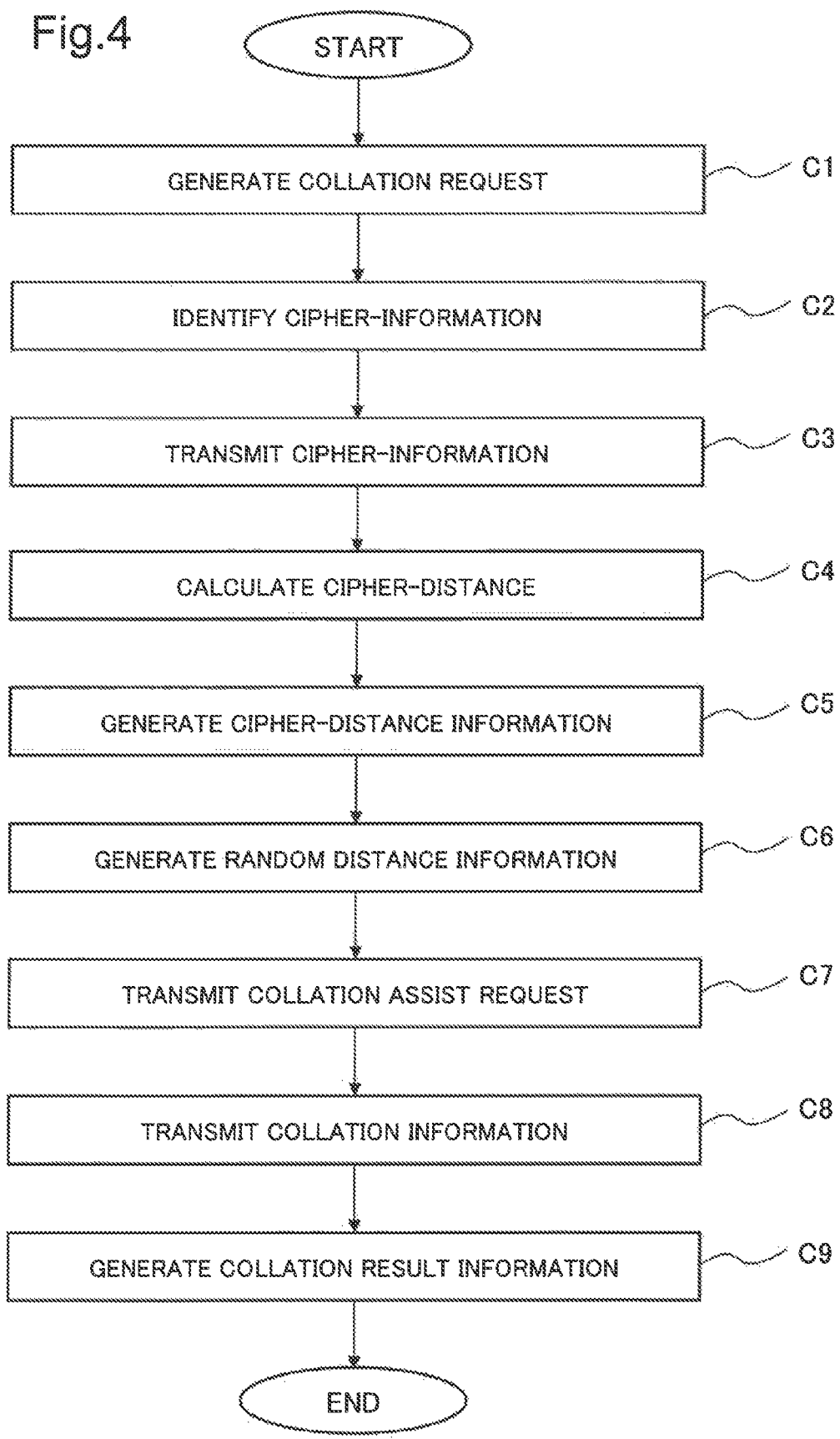
FIG. 4 is a flowchart illustrating a processing flow in a cipher-text collation phase of the collation system according to the first example embodiment.

Next, referring to FIG. 4, processing in a cipher-text collation phase of the collation system 101 according to the first example embodiment will be described. FIG. 4 is a flowchart illustrating a processing flow in the cipher-text collation phase of the collation system 101 according to the first example embodiment.

The collation request unit 110 in the collation request device 103 receives a registration identifier and target data, for example, from an external device. The collation request unit 110 generates a collation request for requesting cipher-information associated with the received registration identifier in cipher-registration-information (step C1). The collation request unit 110 transmits the generated collation request to the collation information transmission unit 114 in the data collation device 105.

When the received registration identifier is denoted as an "index", a collation request generated by the collation request unit 110 can be denoted as a form that is, for example, "request=(index)". Further, the collation request unit 110 in the collation request device 103 outputs the received target data to the cipher-distance unit 111 in the collation request device 103.

The collation information transmission unit 114 in the data collation device 105 receives the collation request transmitted by the collation request unit 110 and reads a registration identifier included in the received collation request. The collation information transmission unit 114 identifies cipher-information associated with the read registration identifier in the cipher-registration-information (step C2). The collation information transmission unit 114 transmits the identified cipher-information to the cipher-distance unit 111 in the collation request device 103 (step C3).

The cipher-distance unit 111 in the collation request device 103 obtains the target data output by the collation request unit 110 in the collation request device 103 and further receives the cipher-information transmitted by the collation information transmission unit 114. The cipher-distance unit 111 applies processing based on an additive homomorphic encryption as previously described by referring to Eqn. 1 to the obtained target data and the received cipher-information. By the processing, a cipher-distance in which a distance between the target data and registration data representing a basis of the cipher-information is encrypted is calculated without decrypting the cipher-information (step C4).

In step C4, the cipher-distance unit 111 calculates, for example, an index representing a size of the received target data and encrypts the calculated index. The cipher-distance unit 111 then calculates a value by applying a predetermined computation based on the target data to encrypted registration data included in the received cipher-information. The cipher-distance unit 111 multiplies the calculated value, the encrypted index representing a size of the target data, and the encrypted index representing a size included in the received cipher-information and thereby calculates the cipher-distance.

The cipher-distance unit 111 outputs the calculated cipher-distance to the distance set unit 112 in the collation request device 103.

For description convenience, it has been assumed that the cipher-distance unit 111 calculates a distance between target data and registration data, however, it is not necessary to be a distance, but another index (a similarity degree representing an extent that target data and registration data are similar to each other) is also employable. This is similar in each example embodiment described above.

The distance set unit 112 in the collation request device 103 obtains the cipher-distance from the cipher-distance unit 111. The distance set unit 112 reads a threshold "t" representing a base for determining acceptability of target data. The distance set unit 112 then calculates values (for description convenience, referred to as "first values") included in a range determined based on the read threshold "t" and generates, by using an encryption key, a cipher-text in which a negative number of each of the calculated first values is encrypted. The distance set unit 112 calculates, for example, integer values included in a range from (—the threshold "t") to 0, as the first values. Alternatively, the distance set unit 112 calculates, for example, integer values included in a range from (—the threshold "t") to "−1", as the first values. The distance set unit 112 calculates a value obtained by multiplying the received cipher-distance and the cipher-text. In this case, the values calculated by the distance set unit 112 are values (for description convenience, referred to as a "second value") in which a value obtained by subtracting each first value from a distance between target data and registration data that is a basis of cipher-information is encrypted. In other words, the distance set unit 112 calculates one or more second values. The first values and the second values are values referred to upon description of example embodiments to be described later.

The distance set unit 112 generates two random numbers (for description convenience, referred to as a "first random number" and a "second random number"), for example, in accordance with a procedure of generating a pseudo-random number. The distance set unit 112 encrypts a first random number by using a public key and thereby generates a cipher-text in which the first random number is encrypted. Then, the distance set unit 112 calculates a value in which each of the generated second value is raised to the power of a "second random number" and further calculates a cipher-text (for description convenience, referred to as "third values") obtained by multiplying the calculated value by the cipher-text in which the first random number is encrypted. The distance set unit 112 generates a comparison information set(s) associating the calculated third values with an unencrypted random number. The distance set unit 112 generates cipher-distance information (or cipher-information) including the generated comparison information set for one or more second values (step C5). The distance set unit 112 outputs the generated cipher-distance information to the shuffle unit 113 in the collation request device 103.

The distance set unit 112 does not always need to generate two random numbers for the calculated second values and may generate one random number. In this case, the distance set unit 112 may calculate values in which each of the generated second values is raised to the power of an "unencrypted random number value" and generate cipher-distance information including the calculated values. In other words, generating procedures in the distance set unit 112 is not limited to the above-described processing procedure.

The shuffle unit 113 in the collation request device 103 obtains the cipher-distance information output by the distance set unit 112. The shuffle unit 113 randomly rearranges arrangement orders of the comparison information sets included in the cipher-distance information in the received cipher-distance information, and thereby generates random distance information in which elements in the cipher-distance information are arranged at random (step C6). The random rearrangement may be that, for example, arrangement orders are changed in accordance with a pseudo-random number artificially generated. The shuffle unit 113 outputs the generated random distance information to the collation assist request unit 115 in the data collation device 105.

The collation assist request unit 115 in the data collation device 105 obtains the random distance information output by the shuffle unit 113, generates a collation assist request for requesting execution of collation processing for the received random distance information, and transmits the generated collation assist request to the collation assist unit 118 in the collation assist device 106 (step C7). The collation assist request can be realized, for example, as information including random distance information.

The collation assist unit 118 in the collation assist device 106 receives the collation assist request transmitted by the collation assist request unit 115. The collation assist unit 118 then reads a decryption key from the key storage unit 119. The collation assist unit 118 reads random distance information included in the collation assist request, decrypts the random distance information by using the read decryption key, and thereby generates collation information in which the received collation assist request is decrypted. The collation assist unit 118 transmits the generated collation information to the determination unit 116 in the data collation device 105 (step C8).

The determination unit 116 in the data collation device 105 receives the collation information transmitted by the collation assist unit 118. The determination unit 116 reads a third value and a random number from a comparison information set included in the received collation information. When the collation information includes an element in which the read third value and the read random number matches, the determination unit 116 generates collation result information indicating a match (step C9). When the collation information does not include an element in which the third value and the random number matches, the determination unit 116 generates collation result information indicating a mismatch. The determination unit 116 may output the generated collation information.

When a comparison information set included in the received collation information includes only one value, the determination unit 116 in the data collation device 105 may generate collation result information on the basis of whether or not the value and 0 are matched with each other. For example, when the collation information includes an element in which the read value and 0 are matched with each other, the determination unit 116 generates collation result information indicating a match. When the collation information does not include an element in which the read value and 0 are matched with each other, the determination unit 116 generates collation result information indicating a mismatch.

Next, advantageous effects relating to the collation system 101 according to the first example embodiment will be described.

According to the collation system 101 of the first example embodiment, it is possible to generate information that enables safer collation processing between collation target information and reference information. The reason is that it is possible to calculate second values without decrypting the distance. The second values are values obtained by encrypting values calculated by adding each first value included in a range determined based on a threshold "t" representing a reference in determining acceptability of target data and the distance between target data and registration data. In this case, the collation system 101 generates collation information including the second value without decrypting the distance.

The collation assist unit 118 receives the collation information, calculates a value that is a result of addition of each first value to a distance by decrypting the received decryption information, and determines whether or not target data are accepted based on whether or not the value satisfies a predetermined condition. In other words, the collation request device 103 does not decrypt a distance between target data and registration data. As a result, there is no possibility of suffering a hill climbing attack where a template is decrypted based on a decrypted distance.

Further, according to the collation system 101 of the present example embodiment, it is possible to collate collation target information and reference information more safely. The reason is that the storage device 104 stores encrypted registration data and an encrypted index representing a size, as described above for step B4 and the like in FIG. 3. Therefore, the collation system 101 of the present example embodiment can reduce a risk of leaking registration data. The reason is that, even when the data stored on the storage device 104 are intercepted, the intercepted data are encrypted.

Further, the collation request device 103 executes calculation processing for cipher-information calculated by the registration data device 102 and thereby calculates a cipher-distance between target data and registration data as described for the step C4 and the like in FIG. 3. Further, the collation request device 103 calculates a value multiplied with random number or the like by using the calculated cipher-distance, as above described for step C5 and the like. Cipher-information as a calculation result of this processing is information including a value different from a distance between target data and registration data. As a result, even when the collation assist device 106 decrypts information included in the cipher-information, a calculated result value is different from the distance between the target data and the registration data. Therefore, the collation system 101 of the example embodiment can reduce a risk of leak of registration data.

The shuffle unit 113 according to the first example embodiment can realize further safer collation processing. The reason is that the shuffle unit 113 can generate different collation information by rearranging orders of elements in the collation information. The shuffle unit 113 rearranges, for example, orders of elements at random, and thereby, the collation system 101 generates different collation information at each time of authentication processing. In this case, even when collation information is intercepted, according to the collation system 101 of the first example embodiment, it is more difficult to generate a template on the basis of the intercepted collation information.

Further, the shuffle unit 113 according to the first example embodiment can realize further safer collation processing. The reason is that third values calculated by the distance set unit 112 are values raised to (a random number)-th power, and therefore it is difficult to estimate a distance between target data and registration data.

Second Example Embodiment

Next, a second example embodiment of the present invention based on the above-described first example embodiment will be described.

In the following description, feature portions according to the present example embodiment will be mainly described, and a configuration similar to that of the above-described first example embodiment is assigned with the same reference number, whereby overlapping description will be omitted.

Figure 5:
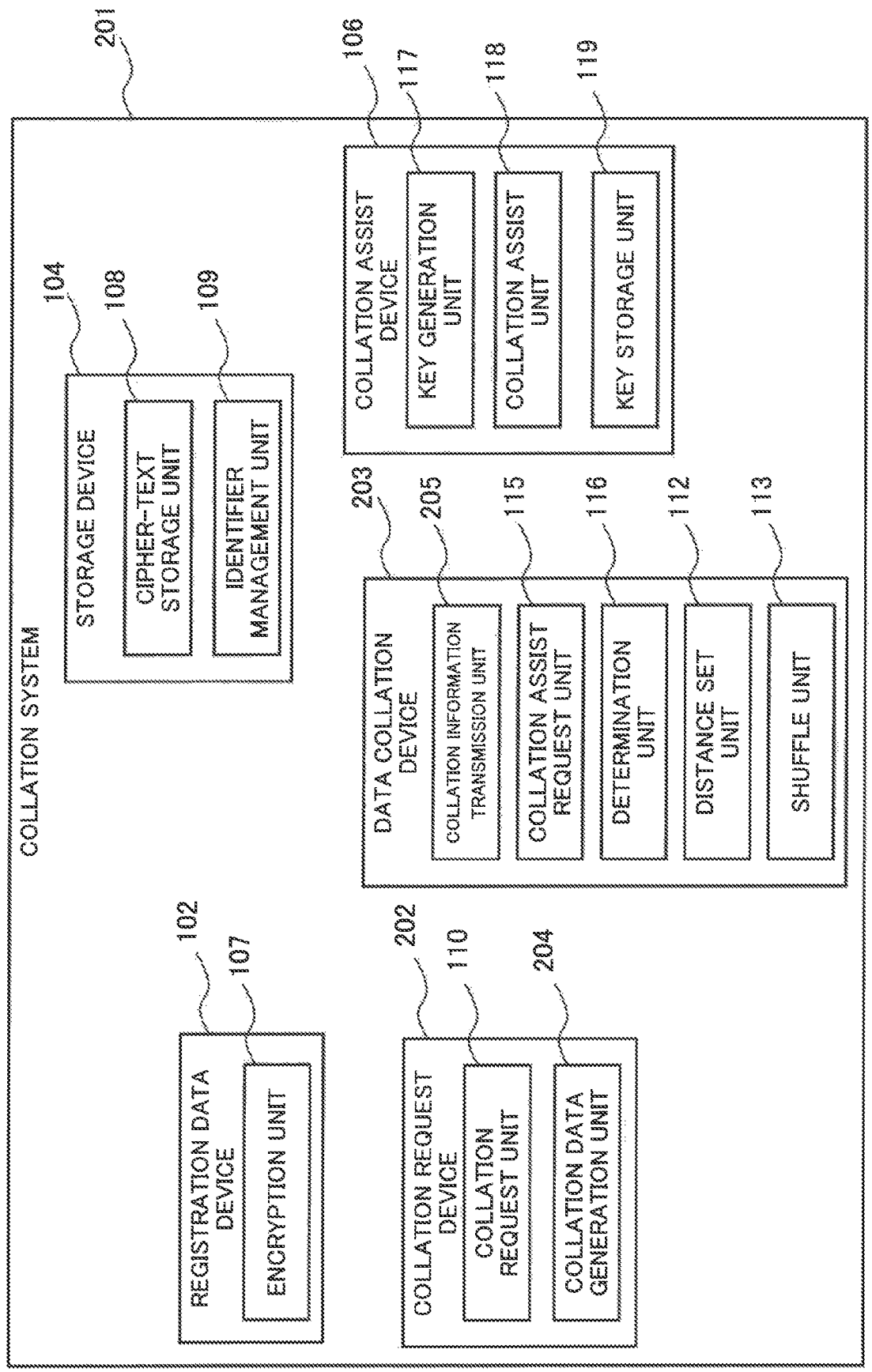
FIG. 5 is a block diagram illustrating a configuration of a collation system according to a second example embodiment of the present invention.

Referring to FIG. 5, a configuration of a collation system 201 according to the second example embodiment of the present invention will be described in detail. FIG. 5 is a block diagram illustrating a configuration of the collation system 201 according to the second example embodiment of the present invention.

The collation system 201 according to the second example embodiment roughly includes a registration data device 102, a collation request device 202, a storage device 104, a data collation device 203, and a collation assist device 106.

The collation request device 202 includes a collation request unit 110 and a collation data generation unit 204.

The data collation device 203 includes a collation information transmission unit 205, a distance set unit 112, a shuffle unit 113, a collation assist request unit 115, and a determination unit 116.

It is assumed that the registration data device 102, the collation request device 202, the storage device 104, the data collation device 203, and the collation assist device 106 are mutually communicable, for example, via a communication network.

Next, processing in the collation system 201 according to the second example embodiment of the present invention will be described in detail. Processing in the collation system 201 of the second example embodiment is roughly classified into three phases including a setup phase, a data registration phase, and a cipher-text collation phase. In the following, processing in each phase will be described in detail.

Processing in the setup phase according to the second example embodiment is similar to the processing in the setup phase according to the first example embodiment. Therefore, description on the setup phase according to the second example embodiment will be omitted. Similarly, processing in the data registration phase according to the second example embodiment is similar to the processing in the data registration phase according to the first example embodiment. Therefore, description on the data registration phase according to the second example embodiment will be omitted.

Figure 6:
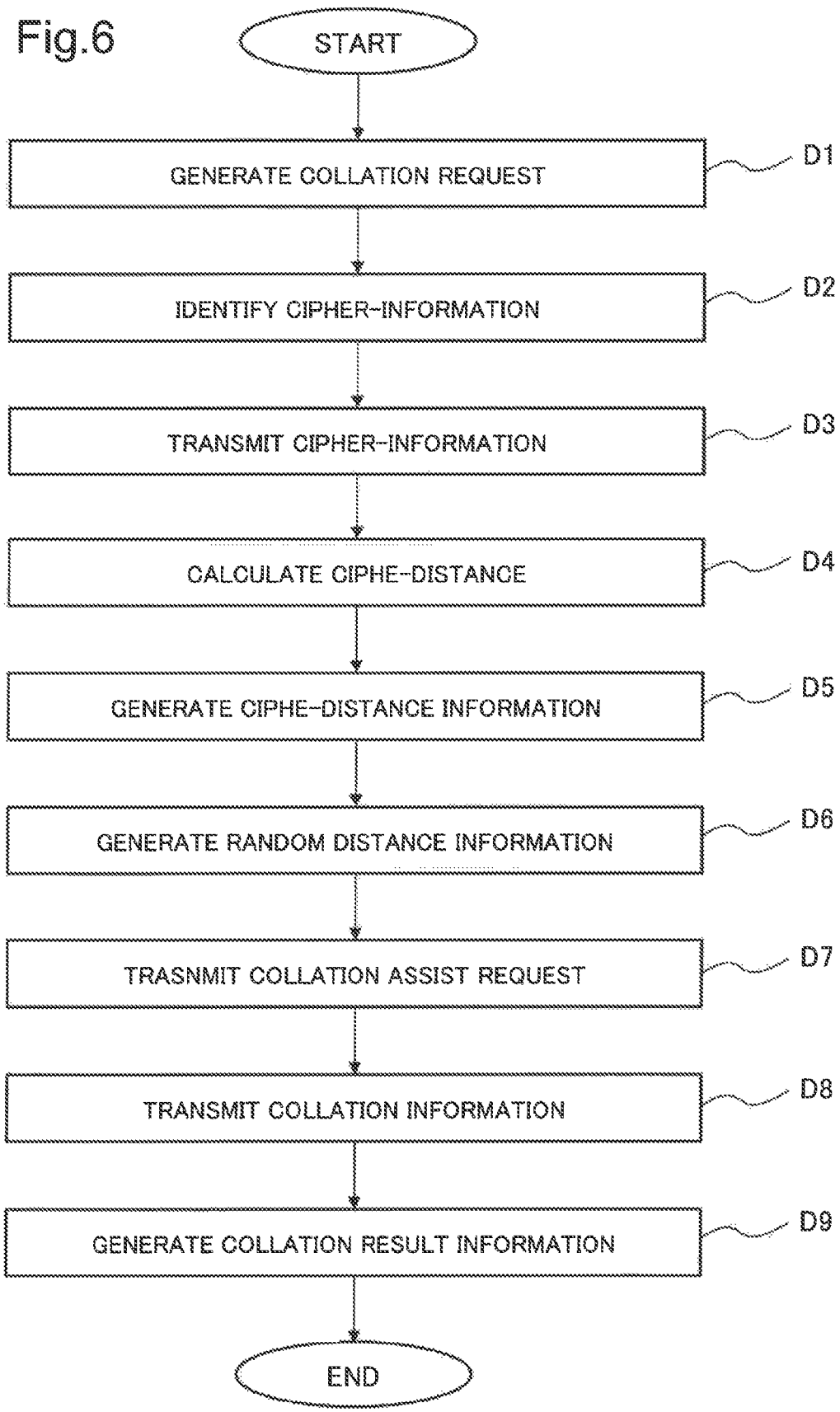
FIG. 6 is a flowchart illustrating a processing flow in a cipher-text collation phase of the collation system according to the second example embodiment.

Referring to FIG. 6, processing in the cipher-text collation phase of the collation system 201 according to the second example embodiment will be described. FIG. 6 is a flowchart illustrating a processing flow in the cipher-text collation phase of the collation system 201 according to the second example embodiment.

Processing in step D1 is similar to the processing in step C1. Further, processing in step D6 to step D9 is similar to the processing in step C6 to step C9. Therefore, description on the processing in these steps will be omitted.

The collation information transmission unit 205 in the data collation device 203 receives a collation request transmitted by the collation request unit 110 in the collation request device 202 and reads a registration identifier included in the received collation request. The collation information transmission unit 205 identifies cipher-information associated with the read registration identifier in cipher-registration-information (step D2). The collation information transmission unit 205 transmits the identified cipher-information to the collation data generation unit 204 in the collation request device 202 (step D3).

The collation data generation unit 204 in the collation request device 202 receives the cipher-information transmitted by the collation information transmission unit 205. The collation data generation unit 204 further receives target data from an external device or the like. The collation data generation unit 204 applies a computation based on an additive homomorphic encryption to the received target data and the received cipher-information and thereby calculates a cipher-distance between the target data and registration data representing a basis of the cipher-information without decrypting the cipher-information (step D4). The collation data generation unit 204 transmits the calculated cipher-distance to the distance set unit 112 in the data collation device 203.

The distance set unit 112 in the data collation device 203 receives the cipher-distance transmitted by the collation data generation unit 204. The distance set unit 112 executes processing similar to the processing indicated in step C5 for the received cipher-distance (step D5).

Next, advantageous effects relating to the collation system 201 according to the second example embodiment will be described.

The collation system 201 of the second example embodiment can generate information for realizing safer collation processing between collation target information and reference information. The reason is that the configuration of the collation system 201 according to the second example embodiment includes the configuration of the collation system 101 according to the first example embodiment.

Further, the collation system 201 according to the second example embodiment can collate collation target information and reference information more efficiently and safely. Even when, for example, the collation request device 202 is a mobile terminal including a relatively small computation resource or a dedicated terminal (e.g., a device including a scanner or a camera) that acquires biometric information, the collation system 201 according to the second example embodiment can realize safe collation processing in a short period. The reason is that in step D4, a data amount transmitted by the collation request device 202 to the data collation device 203 is smaller than the collation system 101 according to the first example embodiment. In the first example embodiment, data transmitted by the collation request device 103 to the data collation device 105 are, for example, random distance information. The random distance information is generated by rearranging orders of elements in a comparison information set and includes a data amount according to values included in a range determined based on a threshold "t" representing a reference for determining acceptability of target data. In contrast, in the second example embodiment, data transmitted by the collation request device 202 to the data collation device 203 are a cipher-distance. Therefore, the data include a data amount according to a cipher-distance.

A data amount of a cipher-distance is smaller than a data amount of a value included in a range determined based on a threshold "t", and therefore a data mount transmitted by the collation request device 202 to the data collation device 203 is smaller than the collation system 101 according to the first example embodiment.

Third Example Embodiment

Next, a third example embodiment of the present invention based on the above-described first example embodiment will be described.

In the following description, feature portions according to the present example embodiment will be mainly described, and a configuration similar to that of the above-described first example embodiment is assigned with the same reference number, whereby overlapping description will be omitted.

The third example embodiment relates to an example in which an n-dimensional Euclidian distance is employed as a distance. In other words, a distance "d" between two vectors that are an n-dimensional (where n represents a natural number) vector X (Eqn. 14) and an n-dimensional vector Y (Eqn. 15) is calculated in accordance with Eqn. 16: i.e.

$$X=(x[1],x[2],\ldots,x[n])$$ (Eqn. 14), $$Y=(y[1],y[2],\ldots,y[n])$$ (Eqn. 15), $$d(X,Y)=(x[1]-y[1])^{\{2\}}+(x[2]-y[2])^{\{2\}}+\ldots+(x[n]-y[n])^{\{2\}}$$ (Eqn. 16), wherein x[i] and y[i] (1≤i≤n) each represent a real number.

When a distance is less than or equal to a threshold "t" representing a reference for acceptability of target data, a collation system 301 according to the third example embodiment determines that a distance between X and Y is small. In other words, the collation system 301 determines that target data Y is acceptable based on registration data X. Alternatively, the collation system 301 determines that the registration data X is acceptable based on the target data Y.

When a distance is more than the threshold "t", the collation system 301 according to the third example embodiment determines that a distance between registration data X and target data Y is long. In other words, the collation system 301 determines that the target data Y is unacceptable based on the registration data X. Alternatively, the collation system 301 determines that the registration data X is unacceptable based on the target data Y.

Further, in the third example embodiment, assuming that the collation system 301 executes encryption or decryption processing based on an additive homomorphic encryption (e.g., a Paillier cryptosystem, etc.), processing in the collation system 301 according to the third example embodiment will be described. However, in the collation system 301 according to the third example embodiment, an additive homomorphic encryption such as an additive Elgamal encryption and an elliptic Elgamal encryption may be employed.

First, a Paillier cryptosystem will be described. A Paillier cryptosystem algorithm includes a key generation algorithm, an encryption algorithm, and a decryption algorithm. In the following, each algorithm will be described in detail.

The key generation algorithm includes processing indicated in the following key generation 1 to key generation 6: i.e.

Key generation 1: receive a security parameter $1^k$,

Key generation 2: select a k-bit prime p and a k-bit prime q at random,

Key generation 3: calculate p×q (designated as "n"),

Key generation 4: calculate $(1+n) \bmod(n^2)$ (designated as "g"),

Key generation 5: generate an encryption key pk by combing the calculated "n" and the calculated "g" as a tuple (n,g), Key generation 6: generate a decryption key sk by combining the calculated prime "p" and the calculated prime "q" as a tuple (p,q), wherein "mod" is an operator of calculating a residue.

The encryption algorithm includes processing indicated in the following encryption 1 to encryption 3: i.e.

Encryption 1: receive an encryption key pk(=(n,g)) and a message M,

Encryption 2: select "r" from $Z_{\{n^{\cdot}2\}}$ at random,

Encryption 3: calculate $((1+m \times n) \times r^n) \bmod(n^2)$ and set the calculated value as a cipher-text C.

The decryption algorithm includes processing indicated in the following decryption 1 to decryption 2. In other words, receive a decryption key sk(=(p,q)) and a cipher-text C.

decryption (:calculate (p−1)×(q−1) (designated as "λ"), decryption 2: calculate $((c^{\{\lambda\}}) \bmod(n^2-1))/((g^{\{\lambda\}}) \bmod(n^2-1)) \bmod(n)$ (designated as "m").

Figure 7:
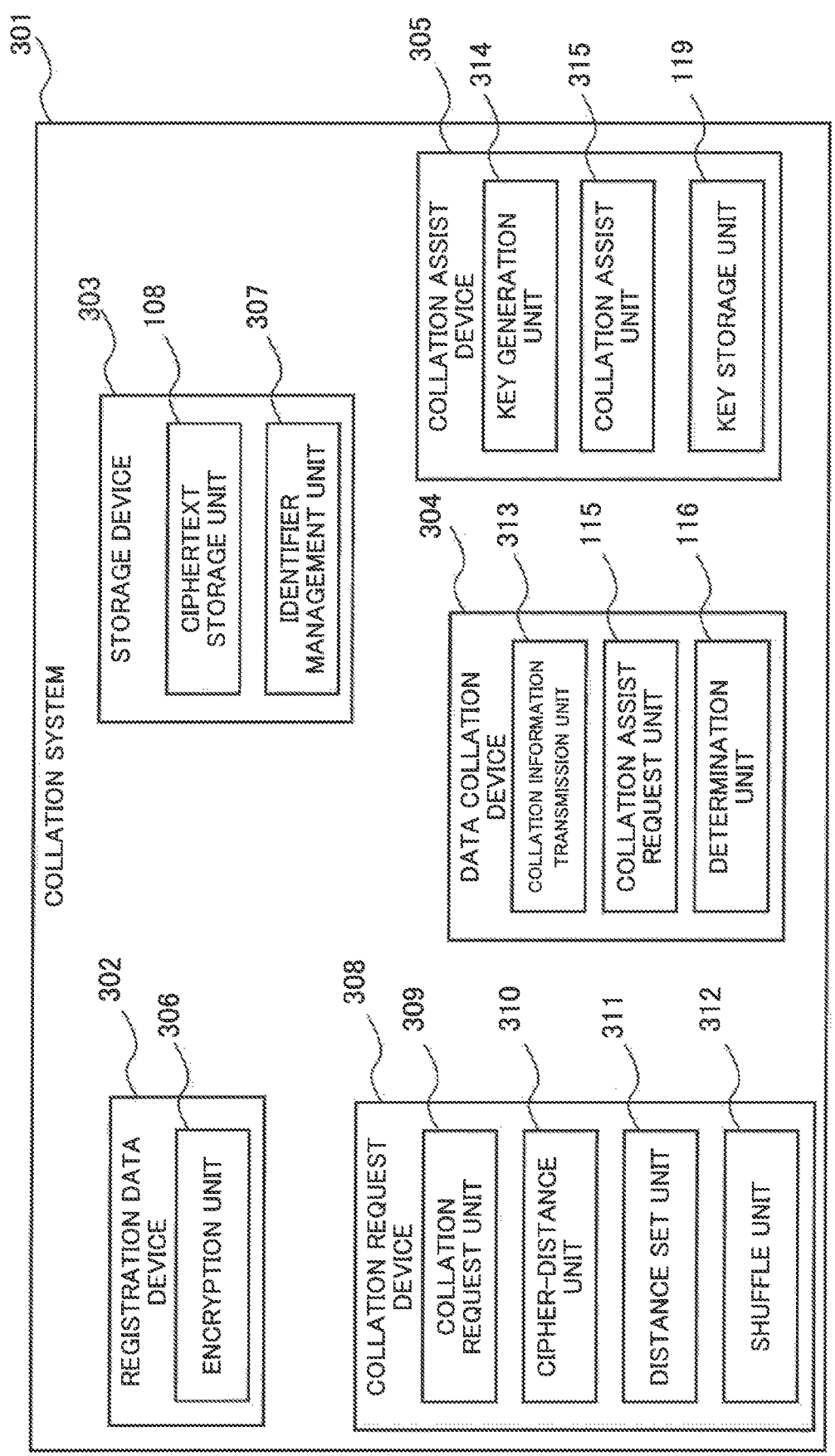
FIG. 7 is a block diagram illustrating a configuration of a collation system according to a third example embodiment of the present invention.

Referring to FIG. 7, a configuration of the collation system 301 according to the third example embodiment of the present invention will be described in detail. FIG. 7 is a block diagram illustrating a configuration of the collation system 301 according to the third example embodiment of the present invention.

The collation system 301 according to the third example embodiment roughly includes a registration data device 302, a collation request device 308, a storage device 303, a data collation device 304, and a collation assist device 305.

The registration data device 302 includes an encryption unit 306.

The storage device 303 includes a cipher-text storage unit 108 and an identifier management unit 307.

The collation request device 308 includes a collation request unit 309, a cipher-distance unit 310, a distance set unit 311, and a shuffle unit 312.

The data collation device 304 includes a collation information transmission unit 313, a collation assist request unit 115, and a determination unit 116.

The collation assist device 305 includes a key generation unit 314, a collation assist unit 315, and a key storage unit 119.

It is assumed that the registration data device 302, the collation request device 308, the storage device 303, the data collation device 304, and the collation assist device 305 are mutually communicable, for example, via a communication network.

Next, processing in the above-described setup phase, data registration phase, and cipher-text collation phase will be described in detail.

First, processing in the setup phase will be described.

Figure 8:
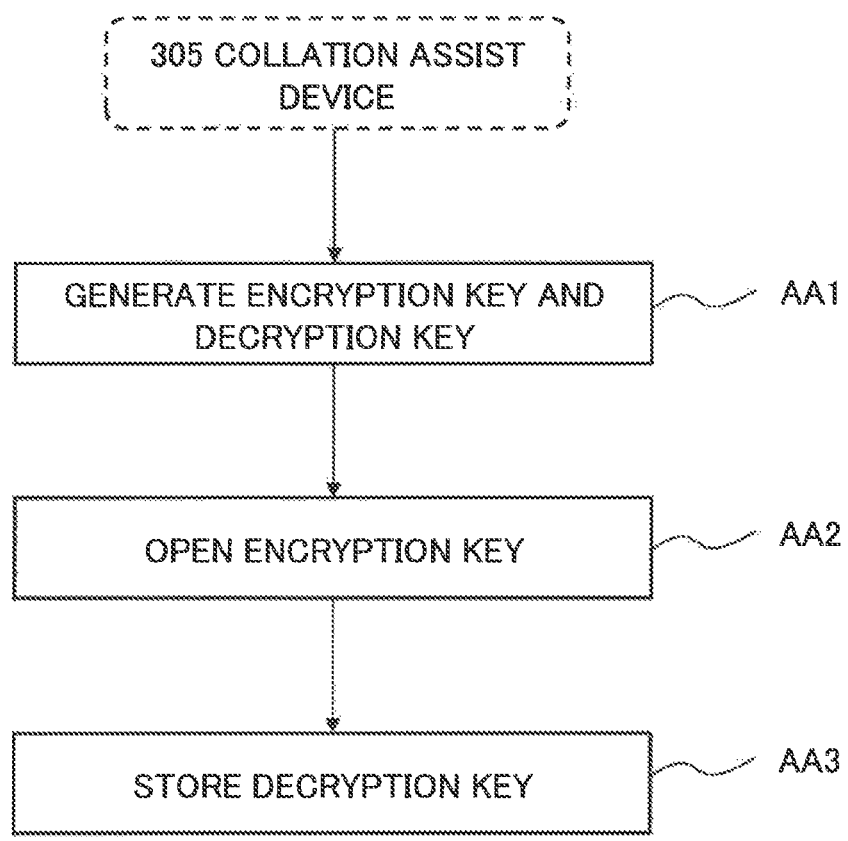
FIG. 8 is a sequence diagram illustrating a processing flow in a setup phase of the collation system according to the third example embodiment.

Referring to FIG. 8, processing in the setup phase of the collation system 301 according to the third example embodiment will be described below. FIG. 8 is a sequence diagram (flowchart) illustrating a processing flow in the setup phase of the collation system 301 according to the third example embodiment.

The key generation unit 314 in the collation request device 308 receives a security parameter $1^k$ for defining a length of a decryption key and a parameter including a threshold "t", for example, from an external device. The key generation unit 314 generates an encryption key pk and a decryption key sk in accordance with the key generation algorithm indicated in the key generation 1 to the key generation 6 (step AA1). The key generation unit 314 opens the generated encryption key pk to the collation system 301 (step AA2). The key generation unit 314 stores the generated decryption key sk on the key storage unit 119 (step AA3).

The processing in step AA1 to step AA3 represents one example of the processing in step A1 to step A3.

Figure 9:
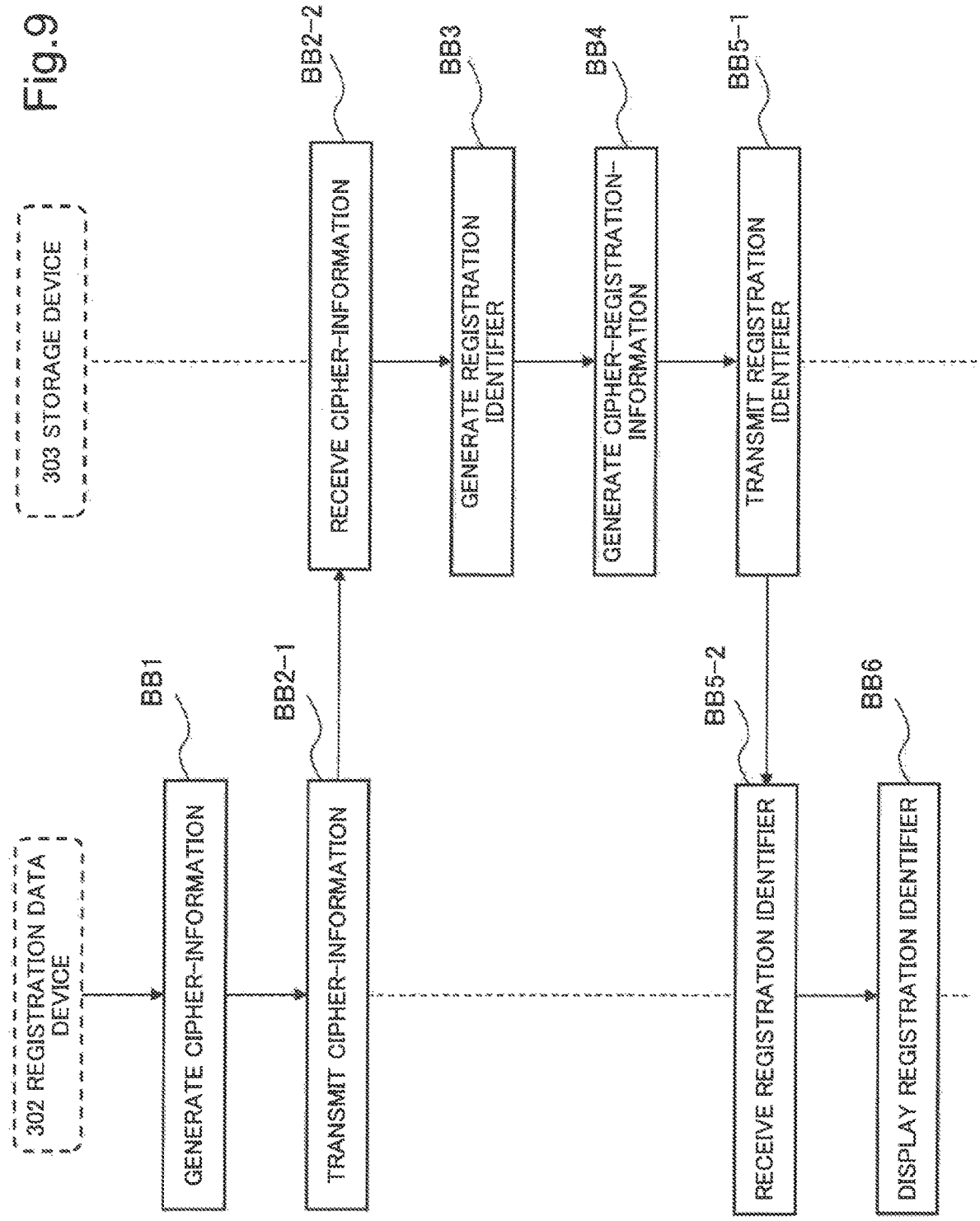
FIG. 9 is a sequence diagram illustrating a processing flow in a data registration phase of the collation system according to the third example embodiment.

Referring to FIG. 9, processing in the data registration phase of the collation system 301 according to the third example embodiment is described below. FIG. 9 is a sequence diagram illustrating a processing flow in the data registration phase of the collation system 301 according to the third example embodiment.

The encryption unit 306 in the registration data device 302 receives registration data X to be concealed, a parameter including a threshold "t" and the like, for example, from an external device. It is assumed that the registration data X are denoted as $(x[1], x[2], \ldots, x[n])$.

Next, the encryption unit 306 calculates $x[i]^{\{2\}}$ (designated as $xx[i]$) by calculating the square of $x[i]$ with respect to an element $x[i]$ included in the received registration data X. The symbol "i" represents a natural number that satisfies $1 \le i \le n$. The encryption unit 306 then encrypts the element $x[i]$, for example, in accordance with the encryption algorithm indicated in the encryption 1 to the encryption 3 by using the encryption key pk generated by the key generation unit 314 and thereby generates cipher-data $c[i]$ in which the element $x[i]$ is encrypted. The encryption unit 306 encrypts $xx[i]$, for example, in accordance with the encryption algorithm indicated in the encryption 1 to the encryption 3 by using the encryption key pk and thereby generates cipher-data $CC[i]$ in which $xx[i]$ is encrypted.

In other words, the encryption unit 306 generates cipher-data C indicated in Eqn. 17 and cipher-data indicated in Eqn. 18.

$$C:(c[1], c[2], \ldots, c[n]) \quad \text{(Eqn. 17)},$$

$$(cc[1], cc[2], \ldots, cc[n]) \quad \text{(Eqn. 18)}.$$

The encryption unit 306 in the registration data device 302 generates cipher-data CC by multiplication of $cc[i]$ (where $1 \le i \le n$) generated in accordance with Eqn. 18. The encryption unit 306 generates cipher-information (C, CC) including the generated cipher-data C and the generated cipher-data CC (step BB1) and transmits the generated cipher-information (C, CC) to the identifier management unit 307 in the storage device 303 (step (BB2-1)).

Next, the identifier management unit 307 in the storage device 303 receives the cipher-information (C, CC) (step (BB2-2)) and generates a registration identifier index capable of uniquely identifying the cipher-information (C, CC) for the received cipher-information (step BB3). The identifier management unit 307 generates cipher-registration-information associating the cipher-information (C, CC) with the generated registration identifier index and stores the generated cipher-registration-information on the cipher-text storage unit 108 (step BB4). The identifier management unit 307 may transmit the generated registration identifier index to the registration data device 302 (step (BB5-1)).

The registration data device 302 receives the registration identifier index transmitted by the identifier management unit 307 (step (BB5-2)) and displays the received registration identifier index on a display unit (not depicted) (step BB6).

The processing in step BB1 to step BB6 represents one example of the processing in step B1 to step B5 in FIG. 3 described above.

Figure 10:
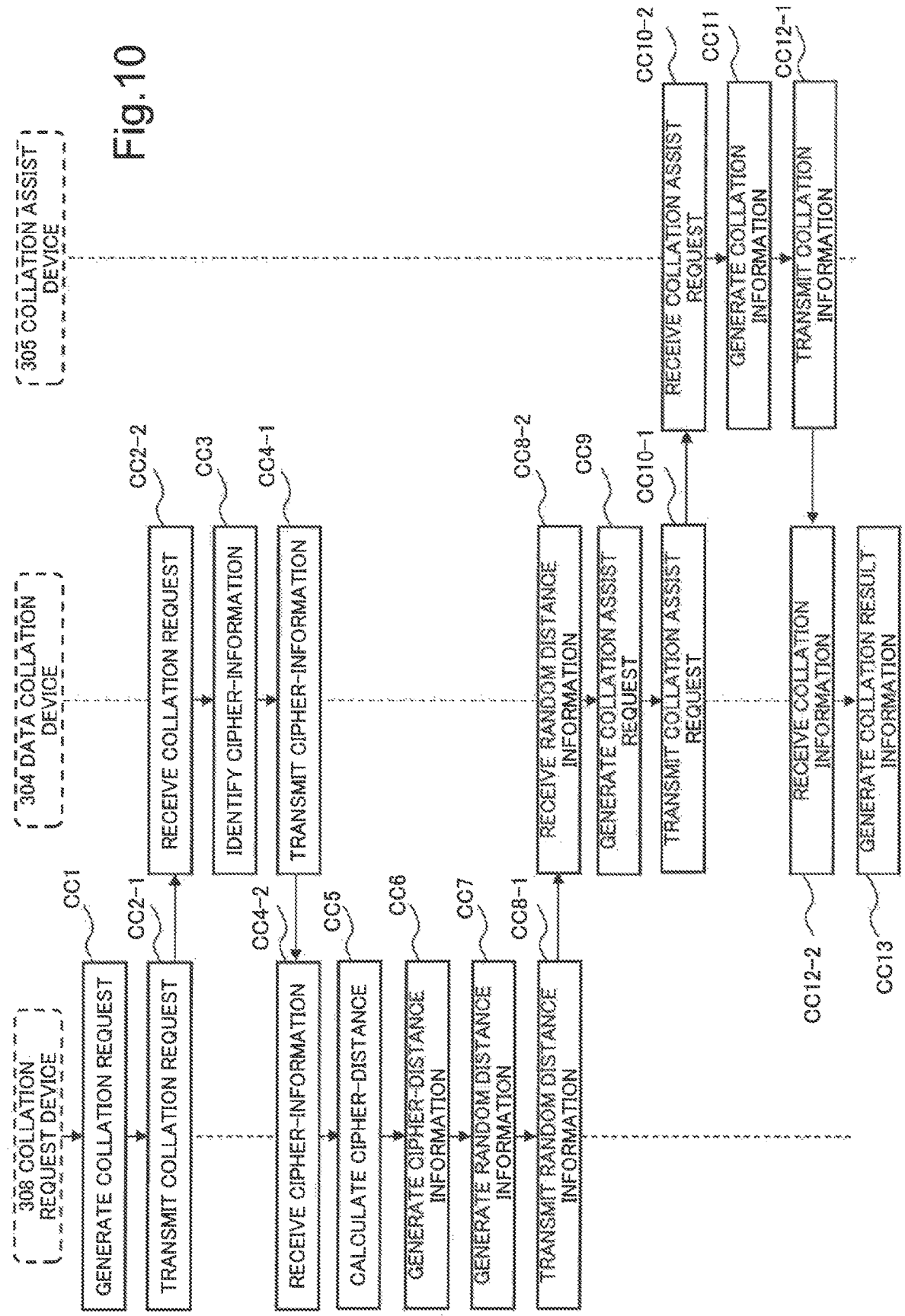
FIG. 10 is a sequence diagram illustrating a processing flow in a cipher-text collation phase of the collation system according to the third example embodiment.

Referring to FIG. 10, processing in the data cipher-text collation phase of the collation system 301 according to the third example embodiment is described below. FIG. 10 is a sequence diagram illustrating a processing flow in the cipher-text collation phase of the collation system 301 according to the third example embodiment.

The collation request unit 309 in the collation request device 308 receives target data Y representing a collation target and a registration identifier index representing cipher-information for collating with the target data Y, for example, from an external device. The collation request unit 309 further reads a parameter including a threshold "t" representing a reference for determining acceptability of target data and an encryption key pk.

It is assumed that the target data Y are denoted as $(y[1], y[2], \ldots, y[n])$.

The collation request unit 309 generates a collation request for requesting cipher-information associated with the received registration identifier index (step CC1) and transmits the generated collation request to the collation information transmission unit 313 in the data collation device 304 (step (CC2-1)). The collation request can be represented, for example, as "request=(index)". The collation request may further include information (e.g., a threshold "t" or an encryption key pk, etc.) different from a registration identifier index.

The collation information transmission unit 313 in the data collation device 304 receives the collation request transmitted by the collation request unit 309 (step (CC2-2)). The collation information transmission unit 313 selects cipher-information C associated with a registration identifier index included in the received collation request from cipher-registration-information stored on the storage device 303 (step CC3). The collation information transmission unit 313 transmits the selected cipher-information C to the cipher-distance unit 310 in the collation request device 308 (step (CC4-1)).

The cipher-distance unit 310 in the collation request device 308 receives the target data Y transmitted by the collation request unit 309 and the cipher-information C transmitted by the collation information transmission unit 313 (step (CC4-2)). The cipher-distance unit 310 calculates a value $dd[i]$ in accordance with processing indicated in the following step (K1-1) to step (K1-3) by using the read cipher-information C and the read target data Y: i.e.

Step (K1-1): calculate a $\{-2 \times y[i]\}$-th power of an element $c[i]$ included in cipher-information C with respect to "i" representing $1, 2, \ldots,$ and n. The result of the calculation is $(c[i])^{\{-2 \times y[i]\}}$. In other words, $\text{Enc}(pk, x[i])^{\{-2 \times y[i]\}} (= \text{Enc}(pk, -2 \times y[i] \times x[i]))$ is calculated.

Step (K1-2): calculate the square of each element $y[i]$ in target data Y with respect to "i" representing $1, 2, \ldots,$ and n, and encrypt the calculated value by using an encryption key pk. In other words, the result of this processing is $\text{Enc}(pk, (y[i])^{\{2\}})$.

Step (K1-3): multiply the result of step (K1-1) (i.e., $(c[i])^{\{-2 \times y[i]\}}$) with the result of step (K1-2) (i.e., $\text{Enc}(pk, (y[i])^{\{2\}})$) with respect to i representing $1, 2, \ldots,$ and n, and thereby calculate a value $dd[i]$.

By the processing indicated in step (K1-1) to step (K1-3), $(c[i])^{\{-2 \times y[i]\}} \times \text{Enc}(pk, (y[i])^{\{2\}}) (= dd[i])$ is calculated. The value $dd[i]$ is equivalent to Eqn. 19.

$$dd[i] = (c[i])^{\{-2 \times y[i]\}} \times Enc(pk, (y[i])^{[2]}) \quad \text{(Eqn. 19)}$$
$$= Enc(pk, -2 \times y[i] \times x[i]) \times Enc(pk, (y[i])^{[2]})$$
$$= Enc(pk, (x[i])^{[2]} - 2 \times x[i] \times y[i] + (y[i])^{[2]} - (x[i])^{[2]})$$
$$= Enc(pk, (x[i] - y[i])^{[2]} - (x[i])^{[2]}).$$

Therefore, by the processing indicated in step (K1-1) to step (K1-3), a value dd[i] is calculated.

The cipher-distance unit 310 in the collation request device 308 multiply each calculated dd[i] with cipher-data CC and thereby calculates a cipher-distance in which a distance between registration data X and target data Y is encrypted (step CC5). In other words, the cipher-distance unit 310 calculates a cipher-distance by executing a computation in accordance with dd[1]×dd[2]× . . . ×dd[n]×CC (designated as "d").

The calculated value "d" is as follows according to the above-described Eqn. 19.

$$d = Enc(pk, (x[1] - y[1])^{[2]} - (x[1])^{[2]}) \times \ldots \times$$
$$Enc(pk, (x[n] - y[n])^{[2]} - (x[n])^{[2]}) \times CC =$$
$$Enc(pk, (x[1] - y[1])^{[2]} + (x[2] - y[2])^{[2]} + \ldots + (x[n] - y[n])^{[2]})).$$

In other words, this represents a cipher-distance in which a distance obtained when executing measurement between registration data X and target data Y by using a Euclidian norm is encrypted. For description convenience, a value "d" is represented as d[0].

The cipher-distance unit 310 outputs the calculated cipher-distance to the distance set unit 311 in the collation request device 308.

Next, the distance set unit 311 in the collation request device 308 obtains the cipher-distance output by the cipher-distance unit 310 and reads a cipher-distance "d" from the obtained cipher-distance. The distance set unit 311 then calculates a value on the basis of the read cipher-distance "d" and a threshold "t", in accordance with processing indicated in the following step (K2-1) to step (K2-5).

Step (K2-1): select a random number r[i] (hereinafter, represented as a "first random number") and a random number A[i] (hereinafter, represented as a "second random number") with respect to i representing 0, . . . , and t.

Step (K2-2): calculate a value Enc(pk,A[i]) in which the random number A[i] is encrypted using an encryption key pk with respect to i representing 0, . . . , and t.

Step (K2-3): calculate a value Enc(pk,−i) in which a value obtained by adding a minus sign to "i" is encrypted using an encryption key pk with respect to i representing 0, . . . , and t.

Step (K2-4): multiply the calculated Enc(pk,−i) with the cipher-distance "d" and thereby calculate a value r[i]. Step (K2-5): multiply the result of step (K2-4) with the result of step (K2-2) and, thereby, calculate a value (d×Enc(pk,−i))$^{\{r[i]\}}$×Enc(pk,A[i]) is calculated.

In other words, by step (K2-1) to step (K2-5), a value dp[i], that is obtained by subtracting each value less than or equal to a threshold "t" from a distance between registration data X and target data Y, multiplying the result with a random number r[i], and adding the result with a random number A[i], is calculated.

The distance set unit 311 generates a comparison information set associating the calculated dp[i] with the random number A[i] and generates cipher-distance information D in which the generated comparison information sets are arranged in an ascending order of a value of "i" (step CC6). In this case, the cipher-distance information D can be represented, for example, as ((dp[0],A[0]),(dp[1], A[1]), . . . , (dp[t],A[t])).

The distance set unit 311 outputs the calculated cipher-distance information D to the shuffle unit 312 in the collation request device 308.

Next, the shuffle unit 312 in the collation request device 308 obtains the cipher-distance information D output by the distance set unit 311 and generates random distance information DP in which orders of comparison information sets in the obtained cipher-distance information D are rearranged. The shuffle unit 312 generates random distance information DP, for example, in accordance with processing indicated in (step CA1) to (step CA2).

Step CA1: generate a permutation π with respect to integers from 0 to t (hereinafter referred to also as [0,t]). In other words, π(j) is also included in [0,t] for j (where 0≤j≤t) included in [0,t], and when j is different, π(j) is different (i.e., there is no overlap with respect to π(j)). The generated permutation π is, for example, a permutation that can be rearranged at random.

Step CA2: generate random distance information DP by rearranging "j" in an ascending order of the generated π(j) with respect to [0,t].

In other words, the shuffle unit 312 rearranges comparison information sets included in the cipher-distance information D in accordance with a random permutation π and thereby generates random distance information DP (step CC7). The shuffle unit 312 transmits the generated random distance information DP to the collation assist request unit 115 in the data collation device 304 (step (CC8-1)).

The collation assist request unit 115 in the data collation device 304 receives the random distance information DP transmitted by the shuffle unit 312 (step (CC8-2)) and generates a collation assist request for collation processing for the received random distance information DP (step CC9). The collation assist request unit 115 transmits the generated collation assist request to the collation assist unit 315 in the collation assist device 305 (step (CC10-1)). The collation assist request can be realized, for example, as information including random distance information DP. It has been assumed that the collation assist request includes random distance information DP, but the collation assist request may further include another piece of data.

The collation assist unit 315 in the collation assist device 305 receives the collation assist request transmitted by the collation assist request unit 115 (step (CC10-2)). The collation assist unit 315 reads a decryption key sk from the key storage unit 119 and decrypts an element dp[i] (where 0≤i≤t) in a comparison information set included in the random distance information DP by using the read decryption key sk. The collation assist unit 315 decrypts the element dp[i] and thereby generates collation information including the decrypted element dp[i] (step CC11). In this processing, the collation assist unit 315 decrypts an element dp[i], for example, by using a decryption key sk. In other words, decryption is executed using a decryption key sk with respect to random distance information DP represented in following Eqn. 20.

$$DP = ((dp[0], AP[0]), (dp[1], AP[1]), \ldots, (dp[t], AP[t])) \quad \text{(Eqn. 20).}$$

The collation assist unit 315 transmits the generated collation information to the determination unit 116 in the data collation device 304 (step (CC12-1)).

Next, the determination unit 116 in the data collation device 304 receives the collation information transmitted by the collation assist unit 315 (step (CC12-2)). When the received collation information indicate a match, the determination unit 116 generates collation result information indicating that the target data Y is acceptable. Otherwise, the determination unit 116 generates collation result information indicating that the target data Y is not acceptable (is unacceptable) (step CC13).

The collation assist unit 315 generates collation result information indicating a match when a decryption result of dp[i] is coincident with AP[i] for a certain "i" ($1 \leq i \leq t$) in the received collation information. The collation assist unit 315 generates collation result information indicating a mismatch when a decryption result of dp[i] does not match AP[i] for any "i" in the received collation information.

The processing in step CC1 to step CC13 represents one example of the processing in step C1 to step C9 indicated in FIG. 4 described above.

In the third example embodiment, cipher-information registered on the storage device 303 includes "number of element in registration data X+1" pieces of cipher-data. Further, decrypted result of cipher-texts for (t+1) thresholds generated in step CC6 includes 0 when a distance between registered registration data and target data is less than or equal to a threshold "t" and is a random number, otherwise. When the (t+1) cipher-texts are shuffled, a distance can be concealed also from the collation assist device 305.

An example of a Euclidian distance has been referred in the third example embodiment. However, applications to another distance (a Hamming distance, a Mahalanobis distance, etc.) can be readily made by modifying step CC5 of the cipher-text collation phase.

Next, advantageous effects relating to the collation system 301 according to the third example embodiment will be described.

The collation system 301 according to the third example embodiment can generate information for realizing safer collation processing between collation target information and reference information. The reason is that the configuration of the collation system 301 according to the third example embodiment includes the configuration of the collation system 101 according to the first example embodiment.

Further, according to the collation system 301 of the third example embodiment, collation target information and reference information can be collated with each other safely. The reason is that the cipher-distance unit 310 further adds a first random number in addition to first values and second values and thereby generates different collation information, for example, at each time of authentication processing. In this case, even when collation information is intercepted, it is more difficult to generate a template on the basis of the intercepted collation information according to the collation system 301 of the third example embodiment.

Further, the collation system 301 according to the third example embodiment can realize further safer collation processing. The reason is that the cipher-distance unit 310 applies a computation using a first random number and a second random number to first values and second values and thereby generates different collation information, for example, at each time of authentication processing. In this case, even when collation information is intercepted, it is more difficult to generate a template on the basis of the intercepted collation information according to the collation system 301 of the present example embodiment.

Fourth Example Embodiment

Next, a fourth example embodiment of the present invention based on the above-described second example embodiment will be described.

In the following description, feature portions according to the present example embodiment will be mainly described, and a configuration similar to that of the above-described second example embodiment is assigned with the same reference number, whereby overlapping description will be omitted.

Figure 11:
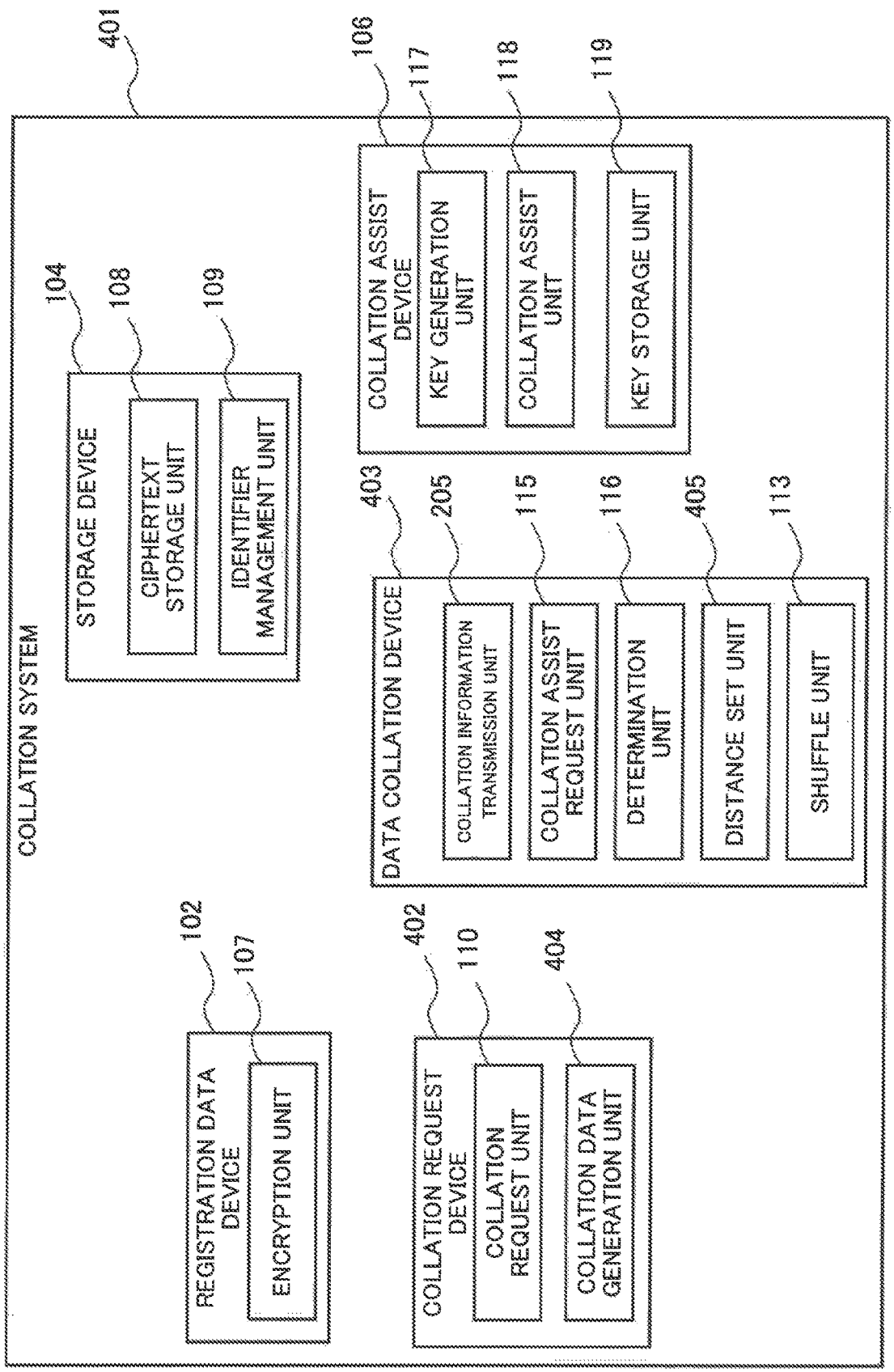
FIG. 11 is a block diagram illustrating a configuration of a collation system according to a fourth example embodiment.

Referring to FIG. 11, a configuration of a collation system 401 according to the fourth example embodiment of the present invention will be described in detail. FIG. 11 is a block diagram illustrating a configuration of the collation system 401 according to the fourth example embodiment.

The collation system 401 according to the fourth example embodiment roughly includes a registration data device 102, a collation request device 402, a storage device 104, a data collation device 403, and a collation assist device 106.

The collation request device 402 includes a collation request unit 110 and a collation data generation unit 404.

The data collation device 403 includes a collation information transmission unit 205, a distance set unit 405, a shuffle unit 113, a collation assist request unit 115, and a determination unit 116.

It is assumed that the registration data device 102, the collation request device 402, the storage device 104, the data collation device 403, and the collation assist device 106 are mutually communicable, for example, via a communication network.

Hereinafter, an processing in each phase will be described in detail. Processing in a setup phase and a data registration phase are similar to the processing described in the above-described example embodiments. Therefore, description for the setup phase and the data registration phase is omitted. In the following, a cipher-text collation phase will be described in detail.

Figure 12:
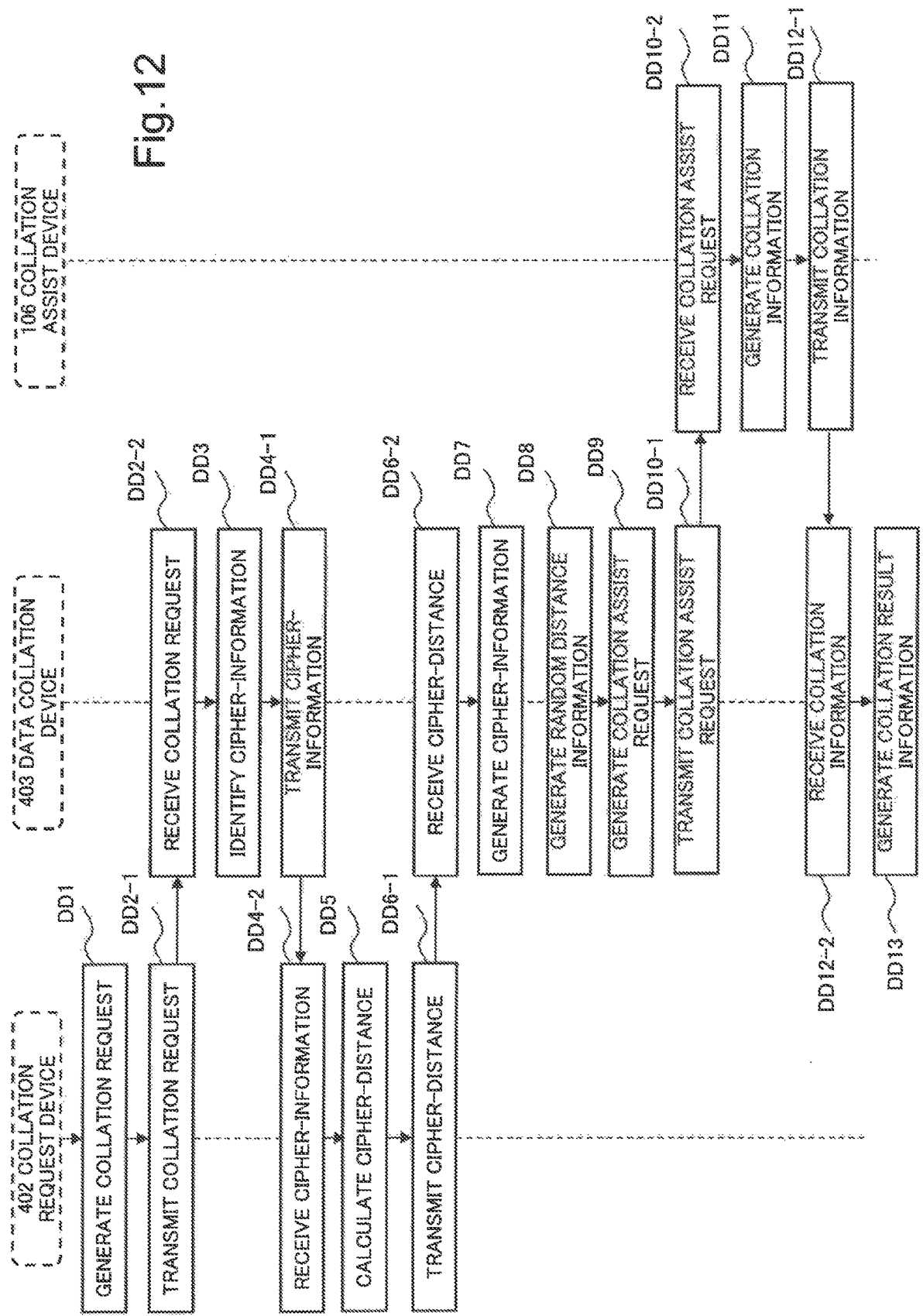
FIG. 12 is a sequence diagram illustrating a processing flow in a cipher-text collation phase of the collation system according to the fourth example embodiment.

Referring to FIG. 12, processing in a data cipher-text collation phase of the collation system 401 according to the fourth example embodiment will be described. FIG. 12 is a sequence diagram illustrating a processing flow in the cipher-text collation phase of the collation system 401 according to the fourth example embodiment.

The collation request unit 110 in the collation request device 402 receives a registration identifier and target data, for example, from an external device. The collation request unit 110 generates a collation request for requesting cipher-information associated with the received registration identifier in cipher-registration-information (step DD1). The collation request unit 110 transmits the generated collation request to the collation information transmission unit 205 in the data collation device 403 (step (DD2-1)).

The collation information transmission unit 205 in the data collation device 403 receives the collation request transmitted by the collation request unit 110 in the collation request device 402 (step (DD2-2)) and reads a registration identifier included in the received collation request. The collation information transmission unit 205 specifies cipher-information C associated with the read registration identifier in the cipher-registration-information (step DD3). The collation information transmission unit 205 transmits the specified cipher-information C to the collation data generation unit 404 in the collation request device 402 (step (DD4-1)).

The collation data generation unit 404 in the collation request device 402 receives the cipher-information C transmitted by the collation information transmission unit 205 (step (DD4-2)). The collation data generation unit 404 calculates a cipher-distance by executing processing similar to the above-described processing indicated in step CC5 of FIG. 10 by using the received cipher-information C and the read target data Y (step DD5). The collation data generation unit 404 transmits the calculated cipher-distance to the distance set unit 405 in the data collation device 403 (step (DD6-1)).

The distance set unit 405 in the data collation device 403 receives the cipher-distance transmitted by the collation data generation unit 404 (step (DD6-2)), executes processing similar to the processing of the distance set unit 311 for the received cipher-distance, and thereby generates cipher-distance information D (step DD7). The collation data generation unit 404 transmits the generated cipher-distance information D to the shuffle unit 113 in the data collation device 403.

The shuffle unit 113 in the data collation device 403 executes processing similar to the processing in the shuffle unit 312 and thereby generates random distance information DP (step DD8). The shuffle unit 113 outputs the generated random distance information DP to the collation assist request unit 115 in the data collation device 403.

Thereafter, processing similar to the above-described processing indicated in step CC9 to step CC13 of FIG. 10 is executed in step DD9 to step DD13.

Next, advantageous effects relating to the collation system 401 according to the fourth example embodiment will be described.

The collation system 401 according to the fourth example embodiment can generate information for realizing safer collation processing between collation target information and reference information. The reason is that the configuration of the collation system 401 according to the fourth example embodiment includes the configuration of the collation system 101 according to the first example embodiment.

Further, the collation system 401 according to the fourth example embodiment can collate collation target information with reference information efficiently and safely. Even when, for example, the collation request device 402 is a mobile terminal including a relatively small computation resource or a dedicated terminal (e.g., a device including a scanner or a camera) that acquires biometric information, the collation system 401 according to the fourth example embodiment can realize safe collation processing in a short period. The reason is that an amount of data transmitted by the collation request device 402 to the data collation device 403 in step (DD4-1) is smaller than the collation system 301 according to the third example embodiment. In the third example embodiment, the data are, for example, random distance information. In contrast, in the fourth example embodiment, the data are a cipher-distance in which a distance between registration data and target data is encrypted. A data amount of the cipher-distance is smaller than a data amount of values included in a range determined based on a threshold "t", and therefore a data amount transmitted by the collation request device 402 to the data collation device 403 is smaller than the collation system 301 according to the third example embodiment.

Examples of a Euclidian distance have been referred in each above-described example embodiment. However, another distance (a Hamming distance, a Mahalanobis distance, etc.) is employable in each example embodiment.

Fifth Example Embodiment

Figure 13:
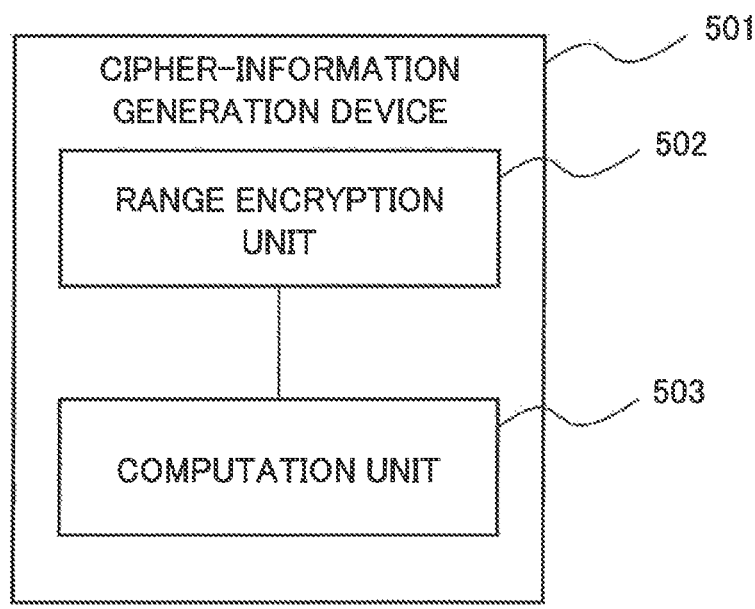
FIG. 13 is a block diagram illustrating a configuration of a cipher-information generation device according to a fifth example embodiment of the present invention.
Figure 14:
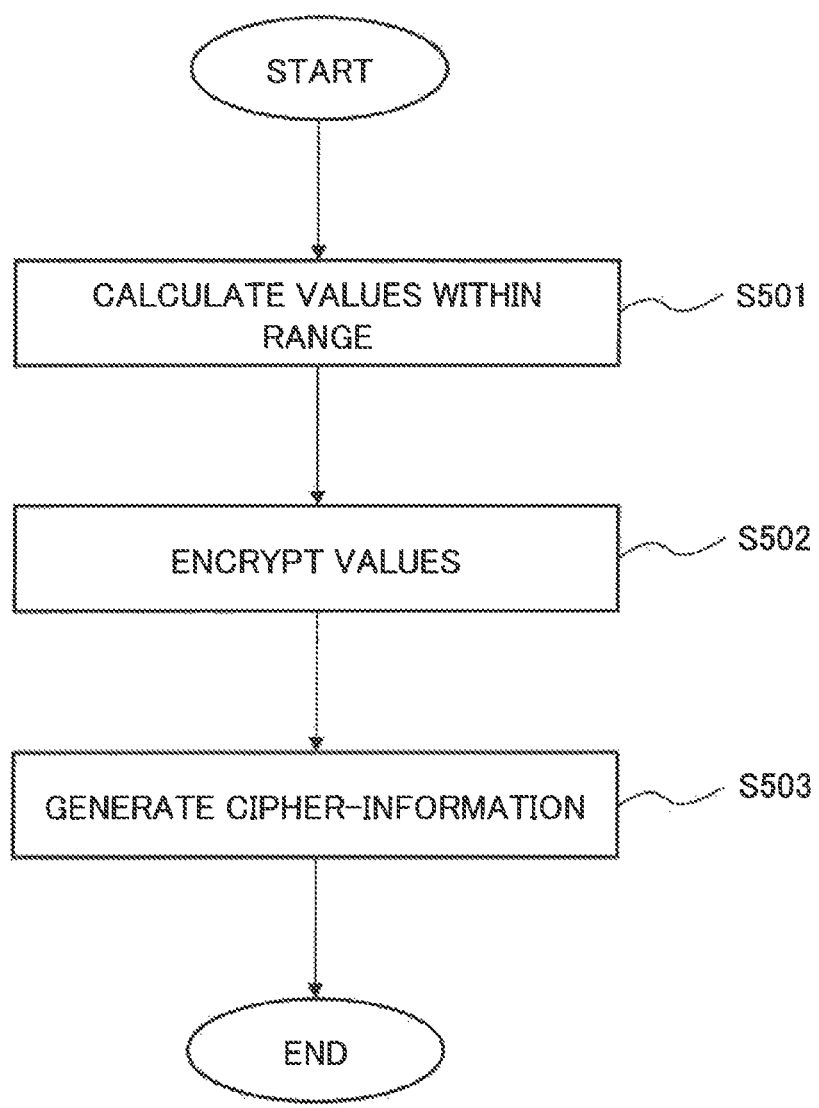
FIG. 14 is a flowchart illustrating a processing flow in the cipher-information generation device according to the fifth example embodiment.

Referring to FIG. 13 and FIG. 14, a configuration of a cipher-information generation device 501 according to a fifth example embodiment of the present invention and processing in the cipher-information generation device 501 according to the fifth example embodiment will be described in detail. FIG. 13 is a block diagram illustrating a configuration of the cipher-information generation device 501 according to the fifth example embodiment of the present invention. FIG. 14 is a flowchart illustrating a processing flow in the cipher-information generation device 501 according to the fifth example embodiment.

The cipher-information generation device 501 according to the fifth example embodiment includes a range encryption unit 502 and a computation unit 503.

The range encryption unit 502 calculates first values included in a range determined based on a threshold "t" (step S501). The range encryption unit 502 calculated, for example, values included in a range from a threshold (−t) to 0 as the first values. Alternatively, the range encryption unit 502 calculates, for example, values included in a range from a threshold (−t) to (−1) as the first values. The range encryption unit 502 then encrypts each calculated first value in accordance with a homomorphic encryption scheme and thereby generates a first cipher-text in which each first value is encrypted (step S502).

The computation unit 503 applies processing based on encryption scheme to the first cipher-text and a second cipher-text in which a certain value (hereinafter, referred to as a "second value") is encrypted based on the encryption scheme, and thereby generates a third cipher-text in which a value obtained by encrypting the sum of each of the first values and the second value (step S503).

When executing processing in accordance with an additive homomorphic encryption as described by referring to Eqn. 1, the computation unit 503 multiplies, for example, a first cipher-text and a second cipher-text and thereby generates the third cipher-text.

Note that the threshold "t" is, for example, a threshold for determining whether or not target data is acceptable. The second value is, for example, a distance between target data and registration data or a similarity degree representing an extent that target data and registration data are similar to each other. In this case, the second cipher-text is, for example, a value in which the distance is encrypted.

The range encryption unit 502 and the computation unit 503 can be realized, for example, by a function included in the distance set unit described in the above-described example embodiments or the like.

Next, advantageous effects relating to the cipher-information generation device 501 according to the fifth example embodiment will be described.

The cipher-information generation device 501 according to the fifth example embodiment can generate information that enables safer collation processing between collation target information and reference information. The reason is that, in collation processing, it is possible to calculate a value obtained by adding first values included in a range determined based on a threshold "t" representing a reference that determines whether or not to be acceptable and a certain value, without decrypting a second cipher-text in which a second value is encrypted. The reason will be described in detail below.

As exemplified in the description on the processing in the cipher-information generation device 501, a second value represents, for example, a distance (or a similarity degree)

between target data and registration data. In this case, the cipher-information generation device 501 generates, without decrypting a distance, a third cipher-text in which a value obtained by adding the distance and each value included in the threshold "t" is encrypted (i.e., a cipher-text in which a content similar to the above-described collation information is encrypted), in accordance with the processing illustrated in FIG. 14.

A decryption device (e.g., the collation assist unit described in each example embodiment) receives the third cipher-text, calculates a value in which each first value and a second value are added by decrypting received decryption information, and determines acceptability of target data according to whether or not the value satisfies a predetermined condition. In other words, a decryption device (e.g., the collation assist device described in each example embodiment) can determine acceptability of target data without decrypting a distance between the target data and registration data. As a result, the cipher-information generation device 501 according to the present example embodiment reduces a possibility of suffering, for example, a hill climbing attack where a template is decrypted based on a decrypted distance.

In contrast, according to the techniques disclosed in PTL 1 to PTL 9, NPL 1, and NPL 2, it is difficult to compare, while a distance is encrypted, magnitudes of the distance and a threshold "t". In other words, these techniques decrypt an cipher-distance and then compare magnitudes of the decrypted distance and a threshold "t". Therefore, according to the techniques, an cipher-distance is decrypted, and therefore the distance may leak to the outside.

Therefore, the cipher-information generation device 501 according to the fifth example embodiment can generate information for realizing safer collation processing between collation target information and reference information.

(Hardware Configuration Example)

A configuration example of hardware resources that realize a collation system or a cipher-information generation device in the above-described example embodiments of the present invention using a single calculation processing apparatus (an information processing apparatus or a computer) will be described. However, the cipher-information generation device (or the collation system) may be realized using physically or functionally at least two calculation processing apparatuses. Further, the cipher-information generation device (or the collation system) may be realized as a dedicated apparatus.

Figure 15:
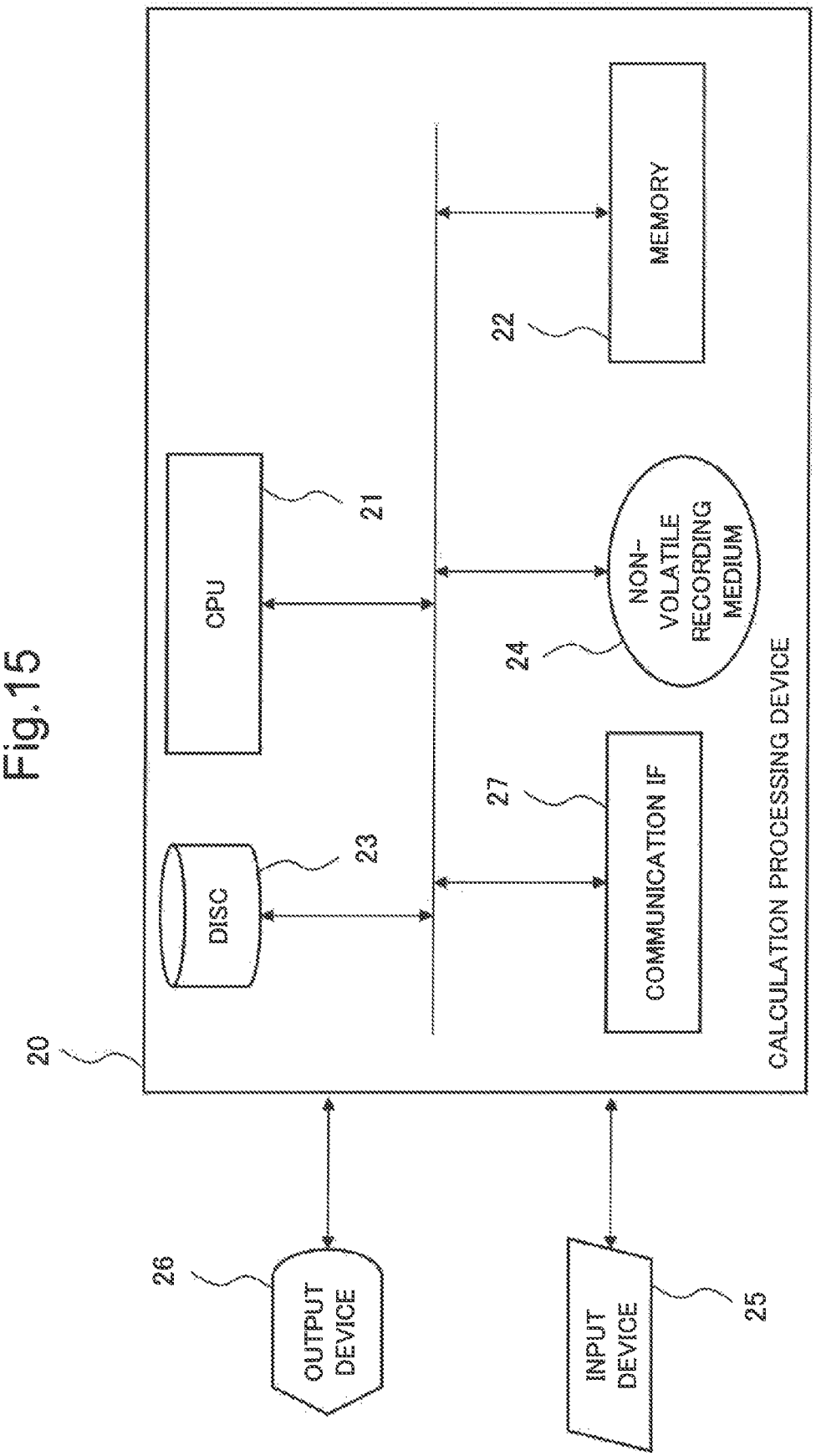
FIG. 15 is a block diagram schematically illustrating a hardware configuration of a calculation processing apparatus capable of realizing a cipher-information generation device or a collation system according to each example embodiment.

FIG. 15 is a block diagram schematically illustrating a hardware configuration of a calculation processing apparatus capable of realizing each of the collation systems according to each of the first example embodiment to the fourth example embodiment or a cipher-information generation device according to the fifth example embodiment. A calculation processing apparatus 20 includes a central processing unit (CPU) 21, a memory 22, a disc 23, a non-transitory recording medium 24. The calculation processing apparatus 20 includes a communication interface (hereinafter, expressed as a "communication I/F") 27. The calculation processing apparatus 20 may, further, include an input apparatus 25, an output apparatus 26. The calculation processing apparatus 20 can execute transmission/reception of information to/from another calculation processing apparatus and a communication apparatus via the communication I/F 27.

The non-transitory recording medium 24 is, for example, a computer-readable Compact Disc, Digital Versatile Disc. The non-transitory recording medium 24 is, for example, Universal Serial Bus (USB) memory, or Solid State Drive. The non-transitory recording medium 24 allows a related program to be holdable and portable without power supply. The non-transitory recording medium 24 is not limited to the above-described media. Further, a related program can be carried via a communication network by way of the communication I/F 27 instead of the non-transitory recording medium 24.

In other words, the CPU 21 copies, on the memory 22, a software program (a computer program: hereinafter, referred to simply as a "program") stored by the disc 23 when executing the program and executes arithmetic processing. The CPU 21 reads data necessary for program execution from the memory 22. When display is needed, the CPU 21 displays an output result on the output apparatus 26. When a program is input from the outside, the CPU 21 reads the program from the input apparatus 25. The CPU 21 interprets and executes a blood pressure estimation program present on the memory 22 corresponding to a function (processing) indicated by each unit illustrated in FIG. 1, FIG. 5, FIG. 7, FIG. 11, or FIG. 13 described above or a collation program (FIG. 2 to FIG. 4, FIG. 6, FIG. 8 to FIG. 10, or FIG. 12) or a cipher-information generation program (FIG. 14). The CPU 21 sequentially executes the processing described in each example embodiment of the present invention.

In other words, in such a case, it is conceivable that the present invention can also be made using the collation program or the cipher-information generation program. Further, it is conceivable that the present invention can also be made using a computer-readable, non-transitory recording medium storing the collation program or the cipher-information generation program.

The present invention has been described using the above-described example embodiments as exemplary cases. However, the present invention is not limited to the above-described example embodiments. In other words, the present invention is applicable with various aspects that can be understood by those skilled in the art without departing from the scope of the present invention.

REFERENCE SIGNS LIST

101 Collation system
102 Registration data device
103 Collation request device
104 Storage device
105 Data collation device
106 Collation assist device
107 Encryption unit
108 Cipher-text storage unit
109 Identifier management unit
110 Collation request unit
111 Cipher-distance unit
112 Distance set unit
113 Shuffle unit
114 Collation information transmission unit
115 Collation assist request unit
116 Determination unit
117 Key generation unit
118 Collation assist unit
119 Key storage unit
201 Collation system
202 Collation request device
203 Data collation device
204 Collation data generation unit
205 Collation information transmission unit
301 Collation system 302 Registration data device
303 Storage device
304 Data collation device
305 Collation assist device
306 Encryption unit
307 Identifier management unit
308 Collation request device
309 Collation request unit
310 Cipher-distance unit
311 Distance set unit
312 Shuffle unit
313 Collation information transmission unit
314 Key generation unit
315 Collation assist unit
401 Collation system
402 Collation request device
403 Data collation device
404 Collation data generation device
405 Distance set unit
501 Cipher-information generation device
502 Range encryption unit
503 Computation unit
20 Computing device
21 CPU
22 Memory
23 Disk
24 Non-transitory recording medium
25 Input device
26 Output device
27 Communication IF

The invention claimed is:

1. A collation system comprising: a memory for storing instructions and a processor connected to the memory and configured to execute the instructions to: calculate first values included in a range based on a threshold value, encrypt the calculated first values in accordance with a homomorphic encryption scheme, and thereby generate a first cipher-text in which the first values are encrypted;
and apply a computation in accordance with the encryption scheme to the first cipher-text and a second cipher-text in which a second value representing an extent of similarity is encrypted in accordance with the encryption scheme, and thereby generate a third cipher-text in which a value obtained by encrypting a sum of the first values and the second value;
calculate a square-value sum in which a first element included in first information is squared, encrypt the first element and the sum, and thereby generate a first element cipher-text in which the first element and the sum are encrypted;
generate the second cipher-text in which the second value representing a distance between the first information and second information is encrypted in accordance with the encryption scheme by using the first element cipher-text and a value of a second element included in the second information;
and calculate the value obtained by adding the first value and the second value by decrypting the third cipher-text, and determine whether the second information R acceptable based on whether the calculated value satisfies a specified condition.

2. The collation system according to claim 1, wherein
the processor is configured to execute the instructions to generate a fourth cipher-text in which a first random number is encrypted, generate a fifth cipher-text by calculating a value obtained by multiplying the third cipher-text by the fourth cipher-text, and generate comparison information sets associating the generated fifth cipher-text with the first random numbers.

3. The collation system according to claim 2, wherein
the processor is configured to execute the instructions to calculate (a second random number)-th power of the third cipher-text and generate the fifth cipher-text by calculating a value obtained by multiplying the calculation result value by the fourth cipher-text.

4. The collation system according to claim 2, wherein
the processor is configured to execute the instructions to rearrange an arrangement order of the comparison information sets at random or at pseudo-random in cipher-information including a plurality of the comparison information sets.

5. The collation system according to claim 1, wherein
the processor is configured to execute the instructions to generate the third cipher-text by calculating a value obtained by multiplying the first cipher-text by the second cipher-text.

6. The collation system according to claim 1, wherein
the processor is configured to execute the instructions to generate a sixth cipher-text by calculating a (−2×the second element)-th power of the first element included in the first element cipher-text and generates the second cipher-text by multiplying the sixth cipher-text, a cipher-text in which a second sum of a square of the second element is encrypted, and a cipher-text in which the sum included in the first element cipher-text is encrypted.

7. A collation method comprising: calculating first values included in a range based on a threshold value, encrypting the calculated first values in accordance with a homomorphic encryption scheme, and thereby generating a first cipher-text in which the first values are encrypted;
applying a computation in accordance with the encryption scheme to the first cipher-text and a second cipher-text in which a second value representing an extent of similarity is encrypted in accordance with the encryption scheme, and thereby generating a third cipher-text in which a value obtained by encrypting a sum of the first values and the second value, calculating square-value sum in which a first element included in first information is squared, encrypting the first element and the sum, and thereby generating a first element cipher-text in which the first element and the sum are encrypted;
generating the second cipher-text in which the second value representing a distance between the first information and second information is encrypted in accordance with the encryption scheme by using the first element cipher-text and a value of a second element included in the second information;
and calculating the value obtained by adding the first value and the second value by decrypting the third cipher-text, and determining whether the second information is acceptable based on whether the calculated value satisfies a specified condition.

8. A non-transitory recording medium recording collation program that causes a computer to realize: a range encryption function configured to calculate first values included in a range based on a threshold value, encrypt the calculated first values in accordance with a homomorphic encryption scheme, and thereby generate a first cipher-text in which the first values are encrypted;
a computation function configured to apply a computation in accordance with the encryption scheme to the first cipher-text and a second cipher-text in which a second value representing an extent of similarity is encrypted in accordance with the encryption scheme, and thereby generate a third cipher-text in which a value obtained by encrypting a sum of the first values and the second value, an encryption function configured to calculate a square-value sum in which a first element included in first information is squared, encrypt the first element and the sum, and thereby generate a first element cipher-text in which the first element and the sum are encrypted;

a cipher-distance function configured to generate the second cipher-text in which the second value representing a distance between the first information and second information k encrypted in accordance with the encryption scheme by using the first element cipher-text and a value of a second element included in the second information;

and a collation function configure to calculate the value obtained by adding the first value and the second value by decrypting the third cipher-text, and determine whether the second information is acceptable based on whether the calculated value satisfies a specified condition.

\* \* \* \* \*

UNITED STATES PATENT AND TRADEMARK OFFICE
CERTIFICATE OF CORRECTION

PATENT NO. : 10,826,680 B2  
APPLICATION NO. : 15/736121  
DATED : November 3, 2020  
INVENTOR(S) : Toshiyuki Isshiki and Haruna Higo Page 1 of 2

It is certified that error appears in the above-identified patent and that said Letters Patent is hereby corrected as shown below:

In the Specification

Column 6, Description of Embodiments, Line 37; Delete "$0 \leq ((x_1-x_2)_2+(y_1-y_2)_2) \leq \delta_d$," and insert --$0 \leq ((x_1-x_2)^2+(y_1-y_2)^2) \leq \delta_d$,-- therefor Column 7, Description of Embodiments, Line 47; Delete "crypto system" and insert --cryptosystem-- therefor Column 10, Description of Embodiments, Line 51; Delete "$\delta_r$." and insert --$\delta_t$.-- therefor Column 10, Description of Embodiments, Line 52; Delete "1, . . . , $\delta_1$}." and insert --1, . . . , $\delta_t$}.-- therefor Column 20, Description of Embodiments, Line 20; Delete "(:calculate" and insert --1:calculate-- therefor In the Claims Column 31, Line 32; In Claim 1, after "comprising:", insert --¶--

Column 31, Line 33; In Claim 1, delete "instructions and" and insert --instructions; and¶-- therefor Column 31, Line 34; In Claim 1, after "to:", insert --¶--

Column 31, Line 38; In Claim 1, after "encrypted;", insert --and--

Column 31, Line 39; In Claim 1, delete "and apply" and insert --apply-- therefor Column 31, Line 56; In Claim 1, after "information;", insert --and--

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 10,826,680 B2

Column 31, Line 57; In Claim 1, delete "and calculate" and insert --calculate-- therefor Column 31, Line 59; In Claim 1, delete "R" and insert --is-- therefor Column 32, Line 30; In Claim 7, after "comprising:", insert --¶--

Column 32, Line 41; In Claim 7, delete "value," and insert --value;¶-- therefor

Column 32, Line 52; In Claim 7, after "information;", insert --and--

Column 32, Line 53; In Claim 7, delete "and calculating" and insert --calculating-- therefor Column 32, Line 59; In Claim 8, after "realize:", insert --¶--

Column 33, Line 5; In Claim 8, delete "value," and insert --value;¶-- therefor

Column 33, Line 14; In Claim 8, delete "k" and insert --is-- therefor

Column 33, Line 17; In Claim 8, after "information;", insert --and--

Column 33, Line 18; In Claim 8, delete "and a collation" and insert --a collation-- therefor